(12) United States Patent
Sikora et al.

(10) Patent No.: US 11,209,836 B1
(45) Date of Patent: Dec. 28, 2021

(54) LONG LINE LOITER APPARATUS, SYSTEM, AND METHOD

(71) Applicant: Vita Inclinata Technologies, Inc., Broomfield, CO (US)

(72) Inventors: Derek Sikora, Denver, CO (US); Caleb B. Carr, Commerce City, CO (US); Logan Goodrich, Golden, CO (US)

(73) Assignee: Vita Inclinata Technologies, Inc., Broomfield, CO (US)

( * ) Notice: Subject to any disclaimer, the term of this patent is extended or adjusted under 35 U.S.C. 154(b) by 0 days.

(21) Appl. No.: 17/330,266

(22) Filed: May 25, 2021

Related U.S. Application Data

(63) Continuation-in-part of application No. 17/161,388, filed on Jan. 28, 2021, and a continuation-in-part of application No. 16/988,373, filed on Aug. 7, 2020, said application No. 17/161,388 is a continuation of application No. PCT/US2019/013603, filed on Jan. 15, 2019.

(60) Provisional application No. 62/966,851, filed on Jan. 28, 2020, provisional application No. 62/757,414, filed on Nov. 8, 2018, provisional application No. 62/627,920, filed on Feb. 8, 2018.

(51) Int. Cl.
*G05D 1/08* (2006.01)
*G06K 9/62* (2006.01)
*G05D 1/00* (2006.01)

(52) U.S. Cl.
CPC ......... *G05D 1/0825* (2013.01); *G05D 1/0066* (2013.01); *G05D 1/085* (2013.01); *G06K 9/6288* (2013.01); *G05D 1/0077* (2013.01)

(58) Field of Classification Search
CPC .... G05D 1/0825; G05D 1/0066; G05D 1/085; G05D 1/0077; G06K 9/6288; B66D 1/46; B66D 1/48; B66D 1/485; B66D 1/50; B66D 1/505; B66D 1/525; B66D 1/56; B66D 1/58; B66D 1/60; B64D 1/22; B64D 47/02; B66C 1/40
See application file for complete search history.

(56) References Cited

U.S. PATENT DOCUMENTS

| | | | |
|---|---|---|---|
| 3,833,189 A * | 9/1974 | Fowler | G05D 1/0858 244/177 |
| 8,591,161 B1 * | 11/2013 | Bernhardt | B64D 1/02 414/137.6 |
| 9,422,139 B1 * | 8/2016 | Bialkowski | B64C 39/024 |
| 9,676,481 B1 * | 6/2017 | Buchmueller | B64D 1/02 |

(Continued)

*Primary Examiner* — Emmanuel M Marcelo
(74) *Attorney, Agent, or Firm* — Æon Law; Adam L. K. Philipp; Martin Spencer Garthwaite

(57) ABSTRACT

Physical and logical components of a long line loiter control system address control of a long line loiter maneuver conducted beneath a carrier, such as a fixed-wing aircraft. Control may comprise identifying, predicting, and reacting to estimated states and predicted states of the carrier, a suspended load control system, and a long line. Identifying, predicting, and reacting to estimated states and predicted states may comprise determining characteristics of state conditions over time as well as response time between state conditions. Reacting may comprise controlling a hoist of the carrier, controlling thrusters of the suspended load control system, and or controlling or issuing flight control instructions to the carrier so as not to increase the response time and or to avoid a hazard.

20 Claims, 15 Drawing Sheets

(56) References Cited

U.S. PATENT DOCUMENTS

| | | | |
|---|---|---|---|
| 10,023,312 B2 * | 7/2018 | Repp | B66C 1/40 |
| 10,071,804 B1 * | 9/2018 | Buchmueller | B64D 1/08 |
| 2004/0032140 A1 * | 2/2004 | Solstad | B66C 1/06 |
| | | | 294/82.15 |
| 2007/0200032 A1 * | 8/2007 | Eadie | B66C 13/063 |
| | | | 244/137.4 |
| 2019/0241267 A1 * | 8/2019 | Sikora | B64D 1/22 |

\* cited by examiner

LONG LINE LOITER APPARATUS, SYSTEM, AND METHOD

CROSS-REFERENCE TO RELATED APPLICATIONS

This application is a continuation-in-part of, claims the benefit of the filing date of and incorporates by this reference U.S. patent application Ser. No. 17/161,388, filed on Jan. 28, 2021; this application is a continuation-in-part of, claims the benefit of the filing date of and incorporates by this reference U.S. patent application Ser. No. 17/105,380, filed on Nov. 25, 2020; this application is a continuation-in-part of, claims the benefit of the filing date of and incorporates by this reference Patent Cooperation Treaty application number PCT/US20/62425, filed on Nov. 25, 2020; this application is a continuation-in-part of, claimed the benefit of, and incorporated by reference U.S. patent application Ser. No. 16/988,373, filed on Aug. 7, 2020; this application is a continuation-in-part of, claims the benefit of the filing date of and incorporates by this reference U.S. patent application Ser. No. 16/935,114, filed on Jul. 21, 2020 and issued as U.S. Pat. No. 11,008,198, issued on May 18, 2021; this application is a continuation-in-part of, further claims the benefit of the filing date of, and incorporates by this reference Patent Cooperation Treaty application number PCT/US20/42936, filed on Jul. 21, 2020; this application claims the benefit of the filing date of and incorporates by this reference U.S. provisional patent application No. 62/966,851, filed on Jan. 28, 2020; this application claims the benefit of the filing date of and incorporates by this reference U.S. provisional patent application No. 62/940,550, filed on Nov. 26, 2019; this application claims the benefit of the filing date of and incorporates by this reference U.S. provisional patent application No. 62/931,666, filed on Nov. 6, 2019; this application claims the benefit of the filing date of and incorporates by this reference U.S. provisional patent application No. 62/876,721, filed on Jul. 21, 2019; this application claims the benefit of the filing date of and incorporates by this reference Patent Cooperation Treaty application number PCT/US19/13603, filed on Jan. 15, 2019; this application claims the benefit of the filing date of and incorporates by this reference U.S. provisional patent application No. 62/757,414, filed on Nov. 8, 2018; this application claims the benefit of the filing date of and incorporates by this reference U.S. provisional patent application No. 62/627,920, filed on Feb. 8, 2018.

FIELD

This disclosure is directed to improved systems and methods for and related to an apparatus, system, and method to perform a long line loiter maneuver with a carrier, such as a fixed-wing aircraft, with enhanced control of a load at an end of the long line.

BACKGROUND

In the 1950's, Laurence Bradford Saint independently conceived, tested, and used a long line loiter maneuver while doing missionary work in Ecuador. In a long line loiter maneuver, a fixed wing aircraft orbits or circles a target location. Orbiting the location was accomplished by placing a mark on a windshield of the aircraft and flying the aircraft in a circle so that the mark stayed on the target location. The aircraft let out a long line, on the order of 1000 to 2000 feet or more. Gravitational forces on the long line pull it downward; aerodynamic forces on the long line reduce if the long line moves toward the target location; therefore, gravitational and aerodynamic forces on the long line cause it to form a 3-dimensional long line spiral. If the long line is sufficiently long, the bottom or center of the long line spiral becomes centered approximately on or above the target location. The aircraft can descend or ascend to lower or raise the bottom of the long line relative to the target location. The number of coils in the long line may be dependent on a velocity of the aircraft, a bank angle or turn radius of the aircraft, a length of the long line, a weight of the long line, a weight of a load on the long line, and aerodynamic forces on the long line and load, such as from airspeed of the long line across its length, air pressure, and a profile of the long line. The long line technique has been used to pick up or drop off equipment (a "load") at target locations.

However, the long line loiter maneuver suffers from significant problems which have prevented its widespread use. For example, there is variability in response time between changes in the aircraft's flight path and velocity and response by the load; this variability is reported by the United States Air Force to vary from 30 seconds to several minutes. In addition, the load can be subject to a "yo-yo" or bobbing effect, in which an elevation of the load changes rapidly and in which the load may hit the ground or other objects. In addition, the load may be subject to high acceleration, a "whiplash" effect, and or may not follow a desirable trajectory when the aircraft transitions from circling the target location to proceeding along a straight course. In addition, a fine position of the load relative to the target location may be difficult to achieve. In addition, aerodynamic forces on the long line and load include atmospheric conditions such as wind, which may be variable and, even when constant, may result in changes in the center of rotation of the long line relative to the center of rotation of the aircraft, as the aircraft circles the target location. Such problems prevent widespread use of the long line loiter maneuver.

As used herein, "carrier" may refer to a fixed wing aircraft, a helicopter, or another airborne system which is capable of orbiting or "loitering" above and around a location, wherein the location is in an atmosphere.

Operators of carriers may use equipment that provides control of a suspended load, including equipment that provides control of a load remote from the carrier, e.g., at or near a load, using powered fans to propel thrust fluid and generate thrust. Such equipment is referred to herein as a suspended load control system ("SLCS"). SLCS are known to be able to control yaw of a load and to horizontally translate a load to a limited extent, though SLCS themselves have been difficult to practically implement, even below carriers such as helicopters and cranes, let alone below a carrier such as a fixed-wing aircraft conducting a long line loiter maneuver. In addition, in the context of the long line loiter maneuver, SLCS would add mass to the load, have limited thrust power, introduce additional cost and complexity, and have limited deployment time. Use of an SLCS in a long line loiter maneuver has not been successfully demonstrated, notwithstanding interest in doing so, interest which may be uninformed by actual design, fabrication, and use of SLCSs.

As used herein, "long line" and "suspension cable" are synonyms.

As discussed herein, when transporting a suspended load by a carrier, observed motions of the carrier and suspended load include the following components: vertical translation (motion up and down) along the Y axis (referred to herein as "vertical translation"); horizontal translation along either or both the X and Z axis; and rotation or "yaw" about the Y axis. Vertical translation may also be referred to herein as "bobbing" when it occurs cyclically. Roll (rotation about the X axis) and pitch (rotation about the Z axis) of the carrier and suspended load may also occur, though if a load is suspended by a cable and is not buoyant, the typical motions of the load are vertical translation, horizontal translation, and yaw. Vertical and horizontal translation of the load may be caused by movement of the long line, an elastic modulus of the long line, movement of the carrier communicated to the load by the long line, winding up or down of a winch or hoist controlling the long line, thrust output by the load, differences in speed and momentum between the load and the carrier, by wind, impacts, external forces, and linear and non-linear interaction among the foregoing. Horizontal translation of the load can manifest as lateral motion or as conical pendular motion of the load centered on a location where the load is secured to the carrier ("pendular motion"); pendular motion generally also includes a component of vertical translation and may also be referred to as elliptical motion. The carrier and suspended load can also travel in an arc, including an arc which completes a circle around a center of a circle, which may also be referred to as "orbiting" and which may also be understood as a form of horizontal translation. Orbiting by a suspended load may be difficult to distinguish from pendular motion by the suspended load. The two may be distinguished based on whether the motion is around or anchored to a securement location between the carrier and the load, in which case it is likely to be pendular motion, or whether the motion is not around a securement location between the carrier and the load, in which case it is likely to be orbiting.

Linear and non-linear interaction among the many forces acting between and on the carrier and a suspended load in a long line loiter maneuver are known to cause many undesirable, unpredictable, and difficult to control motions of either or both the load and the carrier, such as yaw, bobbing, high acceleration forces, and imprecise fine position and elevation control of the load. These undesirable outcomes may cause delays, damage to equipment and objects, failed missions, and may lead to injury or death of aircrew, a person connected to a long line, and of people on the ground and prevent widespread use of the long line loiter maneuver.

In addition, some long line loiter maneuvers may involve an obstacle, such as a building, bridge, surface, cliff wall, rock, tree, wires, overhang, or other obstacle that may interfere with one or more of carrier, load, and/or long line.

Use of an SLCS, a carrier, a load, and other components in a long line loiter maneuver may be improved, made easier, less hazardous, and/or made more likely with a method, system, and apparatus to allow an SLCS, hoist, and carrier to increase control of the load in the long line loiter maneuver and to predict, identify, and or respond to circumstances in which control of the load in the long line maneuver cannot be maintained within safety parameters.

DETAILED DESCRIPTION

Figure 1:
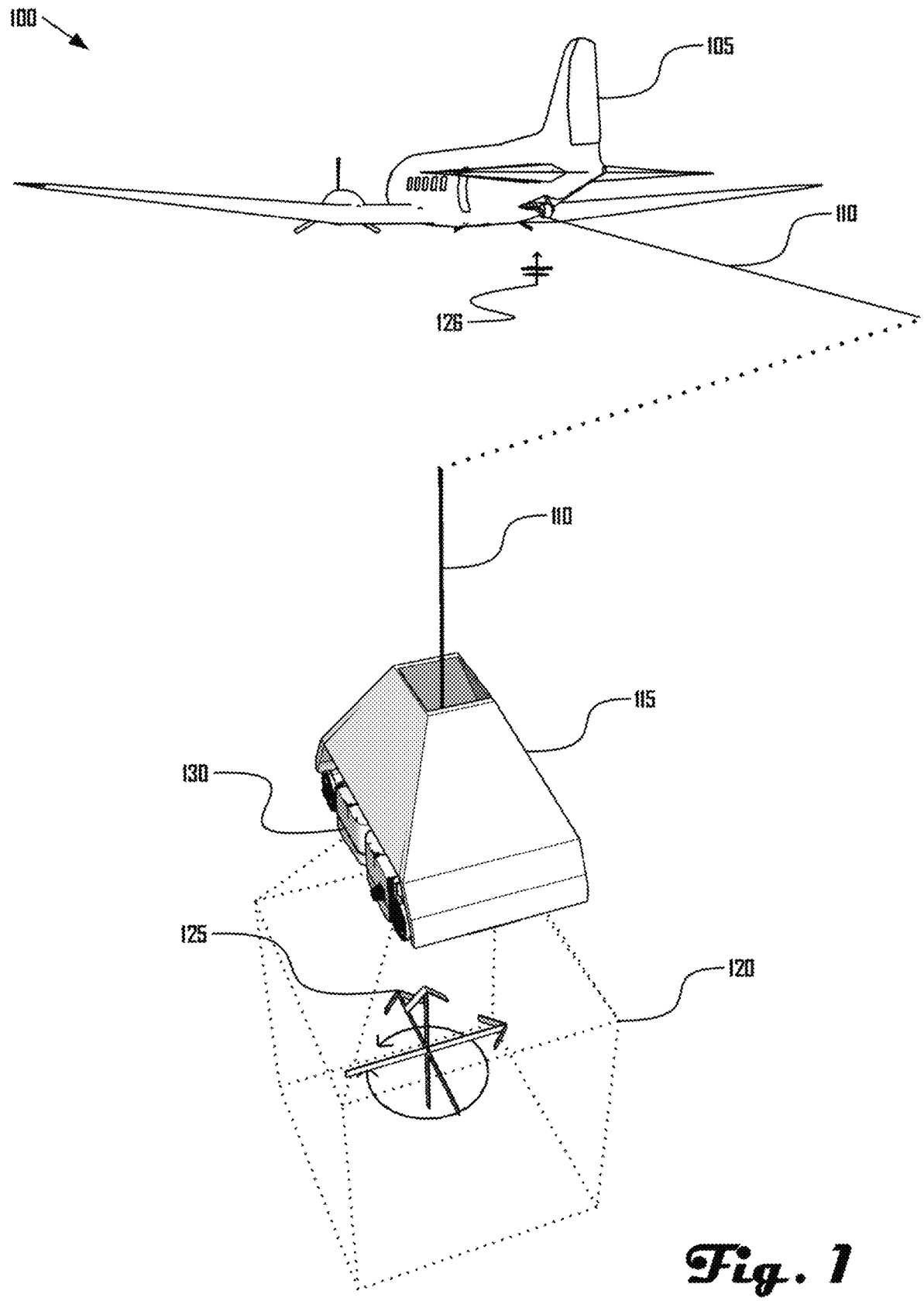
FIG. 1 illustrates selective oblique perspective views of a carrier, a long line, a suspended load control system ("SLCS"), and a load performing a long line maneuver, in accordance with an embodiment.

In overview, a long line loiter control system disclosed herein comprises physical components such as a carrier, a carrier hoist, a long line or suspension cable ("long line" or "suspension cable" may be used interchangeably), a suspended load control system ("SLCS"), and operational components discussed further herein. In overview, the long line loiter control system further comprises logical components such as a long line loiter operational module (also referred to as an "operational module"), a long line loiter data fusion and control module, and a hoist for long line loiter operational module.

In overview, the long line loiter control system physical and logical components address control of a long line loiter maneuver conducted beneath a carrier, such as a fixed-wing aircraft. In overview, control of the long line loiter maneuver comprises identifying, predicting, and reacting to estimated states and predicted states of components of the long line loiter control system, such as according to a system model. The system model may comprise, for example, a center or orbit of the carrier, a center or orbit of the suspended load control system, a target location, a mass of the suspended load control system and load, a length of the long line, an inertia of suspended load control system and load, a movement and rotation of the suspended load control system, a height above ground of the suspended load control system, a movement and rotation of the carrier, a height above ground of the carrier, an aerodynamic model of the long line, a gravitational force on the long line, and disturbance estimations of wind force, sea state, and relative motion between the suspended load control system and carrier, wherein the movement and rotation of the carrier comprises at least one of a bank angle and a velocity or a center of orbit.

Certain of the information processed in the system model may be described as "state information" and certain of it may be described as "parameter information" or as "parameters". For example, parameters may comprise elements which may be actively varied by the long line loiter system, such as a length of long line, thrust and flight control settings of the carrier, thrust output of EDF of the SLCS, and the like. For example, "state information" may comprise elements which may not be actively varied by the long line loiter system and or which may respond to changes in parameters, such as, for example, a mass of SLCS and load, a moment of inertia of an SLCS and load, position and motion of the SLCS and load, position and motion of the carrier, as well as disturbances, such wind force, and sea state. Significantly, parameter information, state information, and disturbance forces are not "hard-wired" into the long line loiter system as fixed values, but are dynamically determined by logical components thereof.

In overview, reacting to estimated states and predicted states of components of the long line loiter control system may comprise controlling thrusters (also referred to as one or more fan arrays) of the SLCS, controlling a hoist of the carrier, or controlling or issuing flight control instructions to the carrier to drive the SLCS toward or relative to a target, notwithstanding that the SLCS may be undergo motion or be subject to forces tending to move the SLCS away from the target. As discussed herein, motion of the SLCS may comprise pendular motion, yaw (rotation about a central axis of the SLCS), or horizontal or vertical translation; as discussed herein, the SLCS and load may be subject to linear and non-linear interaction between the load, the long line, and the carrier, and or external perturbation forces, including wind. In addition to controlling the hoist of the carrier and or controlling the carrier or issuing flight control instructions to the carrier, the SLCS may control itself and the load by dynamically exerting force from, for example, thrusters, fans, or propellers (for example, high output electric ducted fans) of the SLCS. Thrusters, fans, propellers and electric ducted fans ("EDFs") may be referred to herein as "thrusters" or "EDFs". Other sources of thrust may be used, such as jets, compressed air, hydrogen peroxide thrusters, rockets, and the like.

In overview, identifying, predicting, and reacting to estimated states and predicted states of components of the long line loiter control system comprises determining characteristics of state conditions over time as well as response time between state conditions of the carrier, of the hoist, and of the SLCS. In overview, estimation or prediction of response time between state conditions of the carrier, of the hoist, and of the SLCS may comprise determining that an estimated or predicted response time between state conditions of the carrier, of the hoist, and of the SLCS is not within a margin, such as a safety margin. When response time moves beyond a safety margin, components of the long line loiter control system may be in or may be in danger of unsafe conditions, such as a bobbing or a "yo-yo" effect, in which the SLCS and load at the end of the long line may cyclically change elevation in a dangerous and or uncontrolled manner. In overview, identifying, predicting, and reacting to estimated states and predicted states of components of the long line loiter control system comprises determining occurrence of or predicting a hazardous state. In overview, the hazardous state may comprise impact with ground or other object and or excessive acceleration. Excessive acceleration may occur due to bobbing or due to a "whip-lash" effect; e.g., a whip-lash effect as may occur when the carrier transitions from orbiting a target location to moving toward a destination.

In overview, the long line loiter control system may respond to estimated or predicted response time not within the margin and or to a hazardous state by, for example, controlling a hoist of the carrier, controlling thrusters of the SLCS, and or controlling or issuing flight control instructions to the carrier so as not to increase the response time and or to avoid the hazard. In overview, not increase the response time may comprise holding or reducing a distance between the carrier and the SLCS, such as by holding steady or reducing a length of long line paid out from the hoist. In overview, not increase the response time may comprise holding or increasing an altitude of the carrier. In overview, not increase the response time may comprise increasing a velocity of the carrier. In overview, to avoid the hazard may comprise controlling thrusters of the SLCS to maneuver to avoid the hazard, and or may comprise controlling the hoist to decrease a length of long line or to increase the length of long line to lessen high acceleration, and or may comprise controlling or issuing flight control instructions to the carrier to change a center of orbit of the carrier, to change a bank angle, altitude, or velocity of the carrier.

In overview, an SLCS, a carrier, and a hoist of the carrier in the long line loiter system may have sensor suites; the sensor suites may obtain data, wherein the data may be processed by logical components of the long line loiter system according to the system model. In the carrier and in the SLCS, the sensor suites may comprise, for example, position sensors, orientation sensors, inertial sensors, proximity sensors, reference location sensors, suspension cable sensors, and thrust sensors. Such sensors may comprise cameras, accelerometers, gyroscopes, magnetometer, inclinometer, directional encoder, radio frequency relative bearing system, gravitational sensors, microelectromechanical systems ("MEMS") sensors, Global Positioning System ("GPS") sensors, lidar/radar sensors, machine vision sensors, range finders, ultrasonic proximity sensors, a hoist sensor, and the like.

In overview, sensor information from the sensor suites may be processed by the long line loiter control system logical components to identify, predict, and react to estimated states and predicted states of components of the long line loiter control system, such as according to a system model, to control the long line maneuver, as discussed herein.

In overview, physical and logical components of the long line loiter control system may thereby provide enhanced control of a long line loiter maneuver by identifying, predicting, and reacting to estimated states and predicted states of components of the long line loiter control system to drive an end of the long line toward or relative to a target or relative to the carrier, to avoid estimated or predicted states which comprise a dangerous condition, such as a response time between state conditions of the carrier, of the hoist, and of the SLCS which are not within a safety margin, or such as a hazardous state, such as impact with an object or an excessive acceleration. Furthermore, the disclosed long line loiter control system may provide telemetry data or information to a carrier, a hoist of the carrier, or to another process.

As discussed herein, "control of a load" or "control of an SLCS" or "control of an end of the long line" should be understood to refer to control of an SLCS and, thereby, as control of a load which may also be secured to the SLCS.

A long line loiter control system can provide benefits to, for example, fixed-wing long line loiter lift and delivery operations as well as to in-flight craft-to-craft contact operations, such as refueling operations.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a fixed-wing lift operation. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally synonymous with "and/or" or "and or" unless the content clearly dictates otherwise.

FIG. 1 illustrates selective oblique perspective views of carrier 105, long line 110, suspended load control system ("SLCS") 130, and load 120, performing a long line maneuver, in accordance with an embodiment.

Carrier 105 may be, for example, a fixed-wing aircraft, a helicopter, a drone, or the like. Carrier 105 is capable of and is circling around or orbiting a target location. Carrier 105 may comprise hoist 201, sensor suite 220 (discussed further in relation to FIG. 2), communication, power, and or control modules or systems, such as to communicate with and or provide power to hoist 201 and or SLCS 130.

Long line 110 may extend from hoist 201 of carrier 105, subject to gravitational and aerodynamic forces, forming a 3-dimensional spiral, descending to SLCS 130 and load 120. Faring 115 may smooth airflow over SLCS 130, such as when SLCS 130 may be released from and or brought back into carrier 105 and when carrier 105 is traveling above stall speed. Faring 115 may comprise flight control surfaces (not illustrated) to control or stabilize passage of SLCS 130 through the air. SLCS 130 may be released from and or brought back into carrier 105 as carrier 105 flies through the air at a speed above its stall speed, such as, for example, 115 mph (this is only an example, stall speed will depend on the type of aircraft), and may be subject to non-laminar airflow. Long line 110 may be coiled around or into hoist 201. SLCS 130 may be secured to long line 110 and released from carrier 105. Load 120 may be secured to SLCS 130 and may be released from and or brought back into carrier 105 or load 120 may be secured to SLCS 130 at and picked up from a target location, during a long line loiter maneuver, and may be reeled up to carrier 105, delivered to another location on the ground, or released in the air, such as with a parachute.

Physical components and logical components of the long line loiter control system, discussed further herein, including sensor suite 220, sensor suite 320 of SLCS 130, and hoist sensor 205, operational module 900, long line loiter data fusion and control module 1000, and hoist for long line loiter operational module 1100, one or more of which may be active or activated prior to or after SLCS 130 is released from carrier 105. Axis 125 and axis 126 indicate that the physical components and logical components are continuously estimating and predicting the state of SLCS 130, including its orientation, position, absolute and relative location (generally, relative to carrier 105, including distance below carrier 105 and distance above ground, indicated by axis 125), as well as the state of carrier 105 including its orientation, position, absolute and relative location (generally, relative to SLCS 130, including distance above SLCS 130 and distance above ground, indicated by axis 126).

SLCS 130 may comprise, for example, an SLCS, a sensor suite, or other equipment which may comprise electrical components, including computer processors, computer memory, signal processing, batteries, logical components, and actuators. Examples of such equipment are discussed herein in relation to suspended load control logical components 801.

SLCS 130 comprises electrical components, including computer processors, computer memory, signal processing, logical components, power supply and or batteries, electronic speed controllers, microcontrollers, sensors, actuators, and the like. The power supply within SLCS 130 may be a single power brick or an array of battery cells wired in series and/or in parallel, such as lithium-polymer (LiPo) cells. The batteries may be removable for inspection and/or to swap discharged and charged batteries. Batteries may be charged while installed (i.e., without having to remove them) via nodes or a wireless charging system. Batteries may include auxiliary battery(ies) to supply a steady supply of power to the processor even if thrusters in fan units draw a relatively large amount of power from main batteries. In embodiments, a carrier from which SLCS 130 is suspended can provide power through a line extending down the long line to SLCS 130. In embodiments, the carrier can provide some power to SLCS 130, while SLCS 130 may obtain other power from an on-board power supply. In various embodiments, SLCS 130 may be powered by a combination of on-board and remote power. In many environments, all power for SLCS 130 is contained on board SLCS 130, allowing fully autonomous operation without dependence on the availability of external power sources or delivery means.

In computer memory or in logic embodied in circuits within SLCS 130 may be modules such as operational module 900 and or long line loiter data fusion and control module 1000. Operational module 900 and or long line loiter data fusion and control module 1000 may provide services to and obtain services from carrier 105, hoist 201, load 120, or another object or party, as discussed herein.

SLCS 130 may provide services to carrier 105, to hoist 201, to load 120, or to another object or party. Services provided by SLCS 130 may include, for example, data acquisition, such as data acquisition for telemetry or situational awareness, as well as load control, such as load control services for load 120, communications, and the like. SLCS 130 may require or benefit from services from carrier 105, from hoist 201, from load 120, or from another object or party. Services to SLCS 130 may include, for example, data or information, communication, electrical power, physical translation, and docking and deployment to and from the carrier.

Load 120 may comprise an animate or inanimate object, such as a person, equipment, a sling transporting or to transport an object, a litter, a container for water or another liquid or gas, or the like. Load 120 may be secured to long line 110 or to a cable or securement mechanism of SLCS 130, such as a hook. A weight or mass of load 120 may change during an operation, such as when part of a load is picked up, put down, or released.

As discussed herein, physical components and logical components of the long line loiter control system may provide enhanced control of a long line loiter maneuver by identifying, predicting, and reacting to estimated states and predicted states of components of the long line loiter control system, such as to drive an end of the long line toward or relative to a target or relative to the carrier, to avoid estimated or predicted states which comprise a dangerous condition. As discussed herein estimated or predicted states which comprise a dangerous condition may comprise a response time between state conditions of the carrier, of the hoist, and of the SLCS which are not within a safety margin, or may comprise a hazardous state, such as impact with an object or an excessive acceleration. Furthermore, the disclosed long line loiter control system may provide telemetry data or information to a carrier, a hoist of the carrier, or to another process or party.

For example, as SLCS 130 is released from carrier 105, logical components such as operational module 900, may determine that a response time between state conditions of the carrier, of the hoist, and of the SLCS are not within a safety margin and may control or direct control of hoist 201 to pause, slow release of, or to reel in long line 110 until the response time returns to within the safety margin.

For example, as SLCS 130 is released from carrier 105 and as a long line loiter maneuver is performed to pick up or drop off load 120, logical components such as operational module 900, may activate thrusters of SLCS 130 to drive SLCS 130 and load 120 toward a target location, to reduce or eliminate yaw or pendular motion of SLCS 130 and or load 120, or to assist in prevention of SLCS 130 and or load 120 from hitting an obstacle.

For example, as a long line loiter maneuver is performed and after load 120 is picked-up, logical components such as operational module 900, may activate hoist 201 to pay out long line 110 as carrier 105 transitions from orbiting to straight flight, so as to avoid an unacceptable acceleration of SLCS 130 and or load 120, such as to avoid a whip-lash effect.

Figure 2:
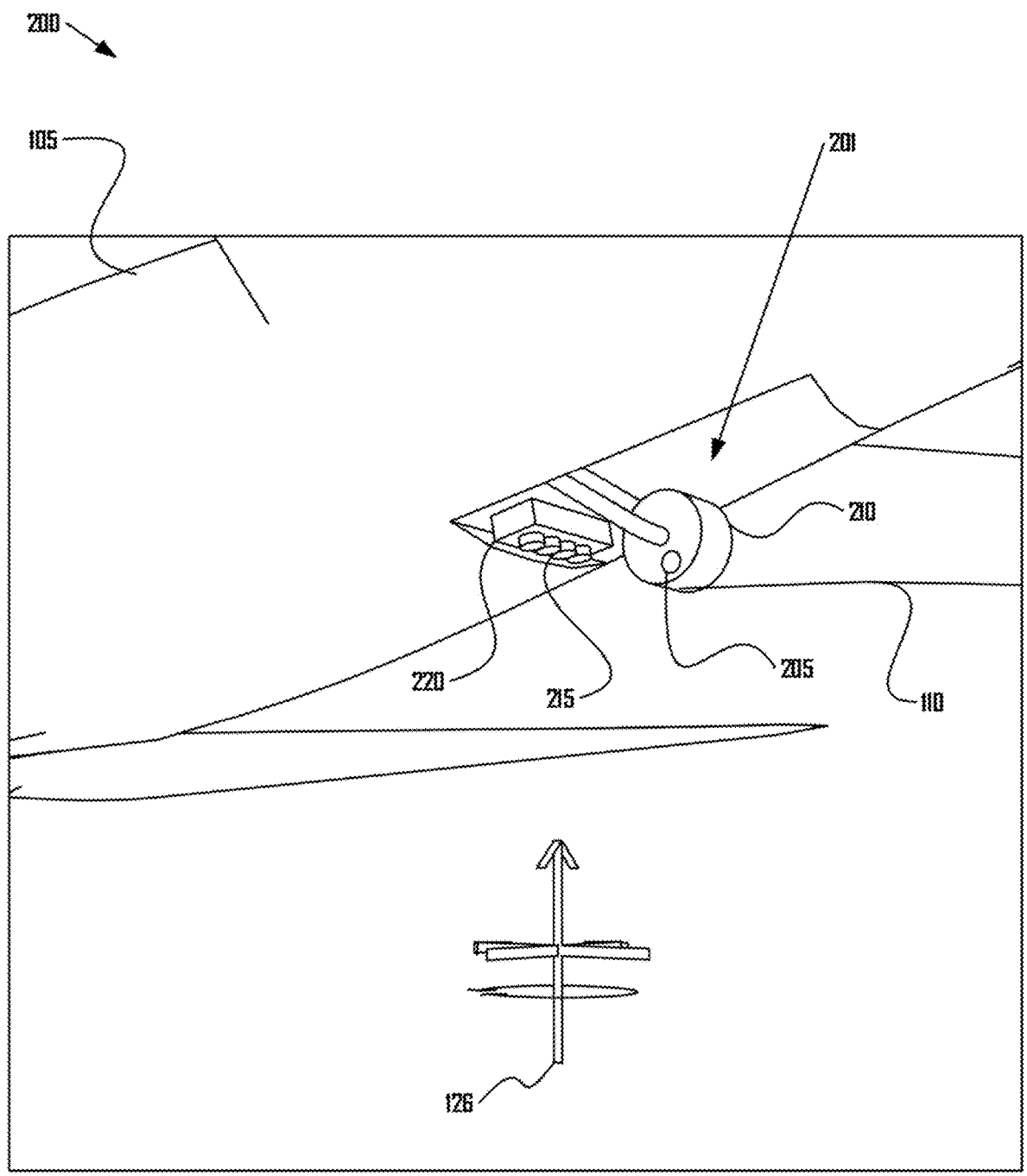
FIG. 2 illustrates an oblique perspective detail of a carrier, a hoist, and a sensor suite in a carrier suitable to perform a long line maneuver, in accordance with an embodiment.

FIG. 2 illustrates an oblique perspective detail of carrier, hoist 201, carrier sensor suite 220, and long line 110, suitable to perform a long line maneuver, in accordance with an embodiment.

Sensor suite 220 is illustrated as comprising sensors 215, which may comprise, for example, position sensors, orientation sensors, inertial sensors, proximity sensors, and reference location sensors. Such sensors may comprise cameras, accelerometers, gyroscopes, magnetometer, inclinometer, directional encoder, radio frequency relative bearing system, gravitational sensors, microelectromechanical systems (MEMS) sensors, Global Positioning System (GPS), lidar/radar, machine vision, range finders, and ultrasonic proximity sensors, and the like. When such sensors detect electromagnetic radiation, e.g., lidar, radar, cameras, such sensors may be positioned to have a view which includes an area in which the SLCS 130, long line 110, and load are expected to be found, such as below and behind carrier 105.

Hoist 201 may comprise hoist sensor 205 and reel 210. Reel 210 may comprise a reel or winch, an electrical, hydraulic, or other motor to turn the reel or winch, a brake to stop rotation of the winch, a winding guide, to guide cable as it winds onto or off of the winch, and hoist sensor 205. A suspension cable, such as long line 110, may be coiled around the winch. Hoist sensor 205 may comprise a cable length encoder, a reel torque encoder, and the like. A cable length encoder may encode or record a length of cable which is unwound from the reel, such as through use of physical, optical, or Hall sensors or the like which measure rotation of the reel and or a roller of the cable guide. A reel torque encoder may encode or record forces on the reel or winch, such as torque, whether under static conditions (e.g., when the winch is not rotating) or dynamic conditions (e.g., when the winch is rotating). Reel torque encoder may comprise, for example, a strain gauge, a scale, a mass or weight measuring device, measurement of electrical or other power applied to turn or hold the winch, or the like. Reel torque encoder and or hoist for long line loiter operational module 1100 may estimate or determine a mass of a load on long line 110 based on the torque and or based on static or dynamic conditions.

As discussed in relation to FIG. 1, axis 125 and axis 126 indicate that sensor suite 220, sensor suite 320, and or hoist sensor 205 are obtaining sensor data, providing it to logical components, wherein the logical components are continuously estimating and predicting the state of carrier 105 and SLCS 130 including such components' orientation, position, absolute and relative location (generally, relative to one another, including distance apart, distance above ground, center of orbit, and motion relative to a center of orbit) and the state of long line 110.

Hoist 201 may comprise electrical components, including computer processors, computer memory, signal processing, logical components, and actuators, including reel 210 and other actuators. Such components are also discussed herein in relation to carrier and hoist logical components 880.

In computer memory or in logic embodied in circuits within hoist 201 may be hoist for long line loiter operational module 1100. Hoist for long line loiter operational module 1100 may comprise logic to operate hoist 201 and to interact with other modules discussed herein. Hoist for long line loiter operational module 1100 may obtain data or information, such as from hoist sensor 205, e.g., cable length encoder and or reel torque encoder, and may provide this data or information to other components, such as SLCS 130 and or carrier 105 and modules thereof. Hoist for long line loiter operational module 1100 may receive data, information, or instructions from, for example, operational module 900 and or long line loiter data fusion and control module 1000 and or carrier 105 (including from crew in carrier 105 or flight or aircraft controls). Hoist for long line loiter operational module 1100 may implement instructions, such as to wind in or unwind (to reel in or pay out) long line 110 and or to communicate with SLCS 130. An example of logic of hoist for long line loiter operational module 1100 is illustrated and discussed in relation to FIG. 11.

Hoist 201 may comprise a housing which may act as or comprise components for hoist 201, such as to isolate components within hoist 201 from the environment. Hoist 201 may be secured to a carrier, whether in an interior space of carrier, on an external structure of carrier, or the like, by securement hardware, by a boom, by an arm, or the like, coupled directly or indirectly to a carrier.

Figure 3:
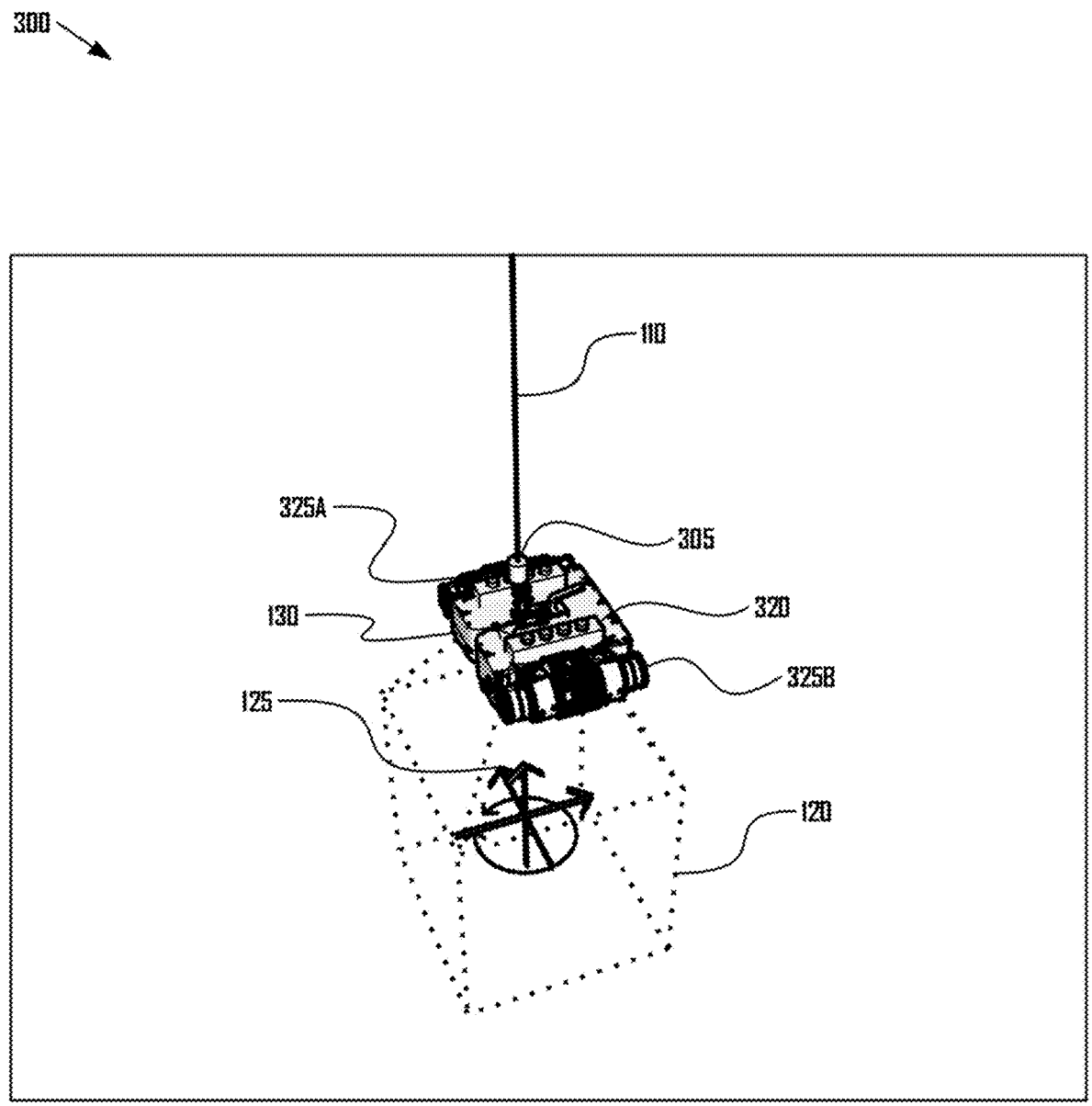
FIG. 3 illustrates an oblique perspective detail of an SLCS and load secured to a long line in a long line maneuver, in accordance with an embodiment.

FIG. 3 illustrates an oblique perspective detail of SLCS 130 and load 120 secured to long line 110 in a long line maneuver, in accordance with an embodiment.

SLCS 130 is illustrated as comprising, for example, fan unit 325A and fan unit 325B. Fan unit 325A and fan unit 325B may separately comprise one or more thrusters, such as EDFs. EDFs may also be referred to herein as "actuators".

Fan units 325 may comprise a cowl which protects one or more EDF. The cowl may be hardened, to withstand impact with the environment. The cowl unit may be made of metal, plastics, composite materials, including fiber reinforced resin, and the like. Fan units may include an air intake, though which air may be drawn, and an outlet. An air intake may comprise one or more screens or filters to prevent entry of some objects into EDF. The EDF in a fan unit may comprise blades and motor(s), such as electric motor(s). The electric motors within an EDF may be sealed against dust, sand, water, and debris. In addition to or in replacement of EDF, alternative sources of thrust may be used, such as, for example, compressed air, hydrogen peroxide jets or thrusters, liquid or solid rocket engines, fans driven by combustion engines, such as jet engines, and the like.

For the sake of convenience in discussing them, fan units on a first side of an SLCS may be discussed as a first fan unit group while fan units on a second side may be discussed as a second fan unit group. The fan units in each fan unit group propel thrust fluid (such as air) in fixed directions, such as fixed directions opposite each other; e.g., offset by 180 degrees. In other embodiments, a fewer or greater number of fan units and/or EDF may be used in an SLCS. In other embodiments, the fan units and/or EDF may be aligned other than offset by 180 degrees, e.g., offset by greater or fewer than 180 degrees, with or without offset along other of the axis. A mechanical steering component may be included to dynamically reposition a fan unit and/or EDF within a fan unit. Fans, thrusters, or EDF may be vertically oriented, rather than horizontally oriented, as illustrated in FIG. 3.

EDF in individual of the fan units may be activated separately, with different power, to produce thrust vectoring or thrust vector control of an assembly of fan units. For example, to produce clockwise yaw (relative to looking down on a top of SLCS 130 in FIG. 3), an EDF in the first fan unit group, may be activated by itself or in conjunction with an opposing EDF in the second fan unit group. To produce lateral translation of SLCS 130 or to produce lateral force opposing pendular motion, EDF in both fan unit groups with a same orientation may be activated. Simultaneous lateral force and rotational force may be produced. Vectored thrust may be thereby generated by a SLCS 130 and operational module 900, thereof.

Also illustrated in FIG. 3 is rotary bearing 305. Rotary bearing 305 may be a rotatory bearing or coupling between long line 110 and may allow the load, SLCS 130, bumper and hook, and load 120 to rotate separately from long line 110. For example, due to rotary bearing 305, the SLCS may be able to control a load, though the load may be subject to rotation or may be rotated by the SLCS, without transfer of a rotational force to long line 110.

SLCS 130 may comprise logical components, such as computer processors, memory, and modules in memory. In computer memory or in logic embodied in circuits within SLCS 130 may be operational module 900 and or long line loiter data fusion and control module 1000. Examples of operational module 900 are illustrated and discussed in relation to FIG. 9. Examples of long line loiter data fusion and control module 1000 are illustrated and discussed in relation to FIG. 10. In the examples discussed herein, operational module 900 may estimate and predict the state of SLCS 130, of carrier 105, and of long line 110 and to respond thereto, such as with instructions to thrusters of SLCS 130, to hoist 210, and or to carrier 105 or a flight crew thereof, to improve performance of a long line loiter maneuver.

Figure 4:
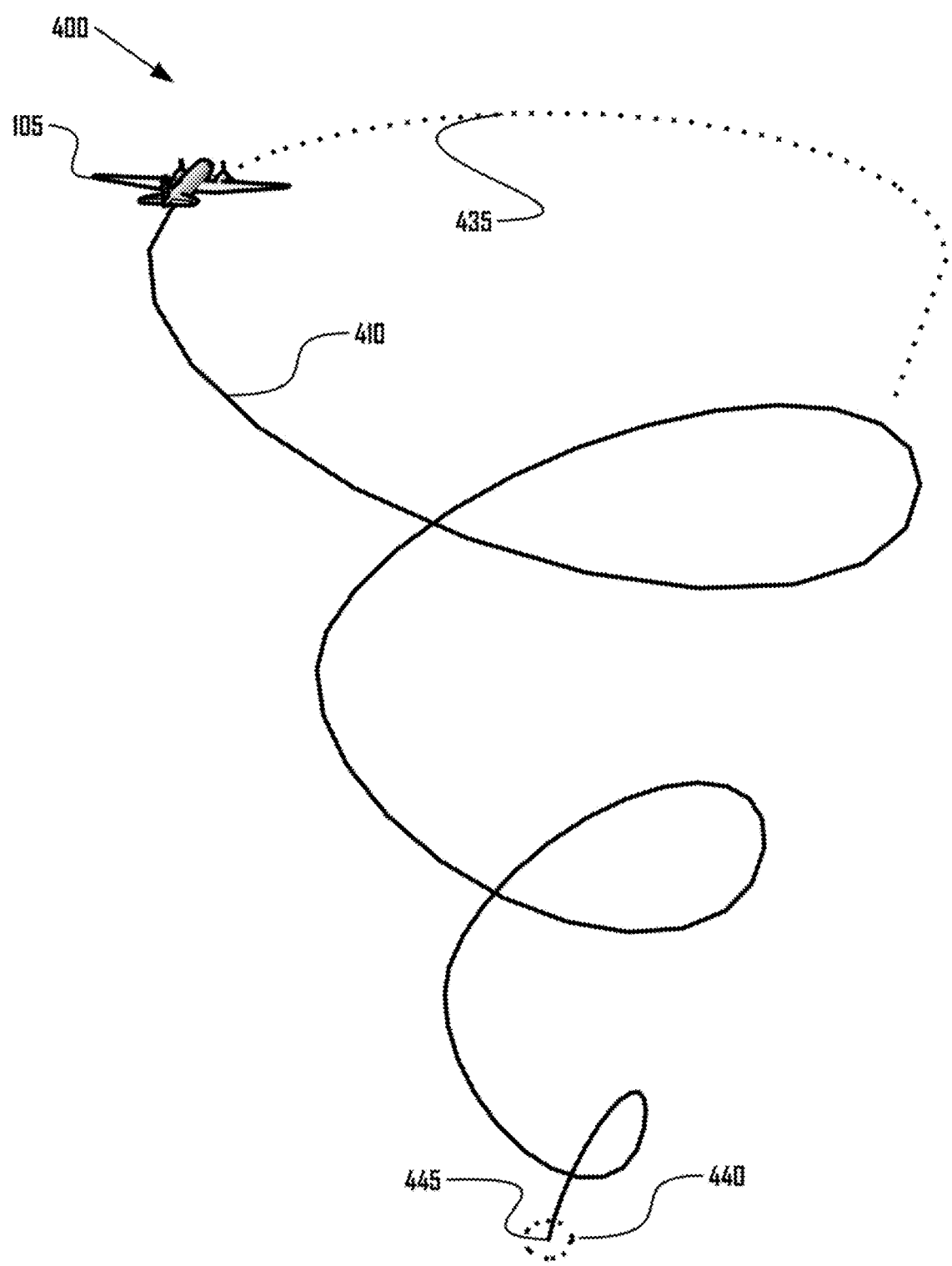
FIG. 4 illustrates a first oblique perspective view of a carrier, a long line, a path of the carrier, a center of orbit, and a location of a load and SLCS, in accordance with an embodiment.

FIG. 4 illustrates a first oblique perspective view 400 of carrier 105, long line 410, current and predicted path of carrier 435, around center of orbit 440, and SLCS 445, with optional load, in accordance with an embodiment. Center of orbit 440 may not be a point, but may include an uncertainty, for example, an uncertainty caused by a size of carrier 105, atmospheric conditions, uncertainty in measurement of the position, orientation, and motion of carrier 105 along current and predicted path of carrier 435, and the like. Within center of orbit 440, SLCS 445 may be influenced by thrusters of SLCS 445, by hoist 201, and by current and predicted path of carrier 435, such as toward a target location, as influenced by physical and logical components of the long line loiter system discussed herein, such as sensor suite 220, sensor suite 320, hoist sensor 205, in conjunction with operational module 900 and or long line loiter data fusion and control module 1000. As discussed herein, such physical and logical components of the long line loiter system discussed herein may improve performance of and or may make safer performance of a long line loiter maneuver, such as according to a response time among characteristics of the state of SLCS 445, carrier 105, and long line 410.

Figure 5:
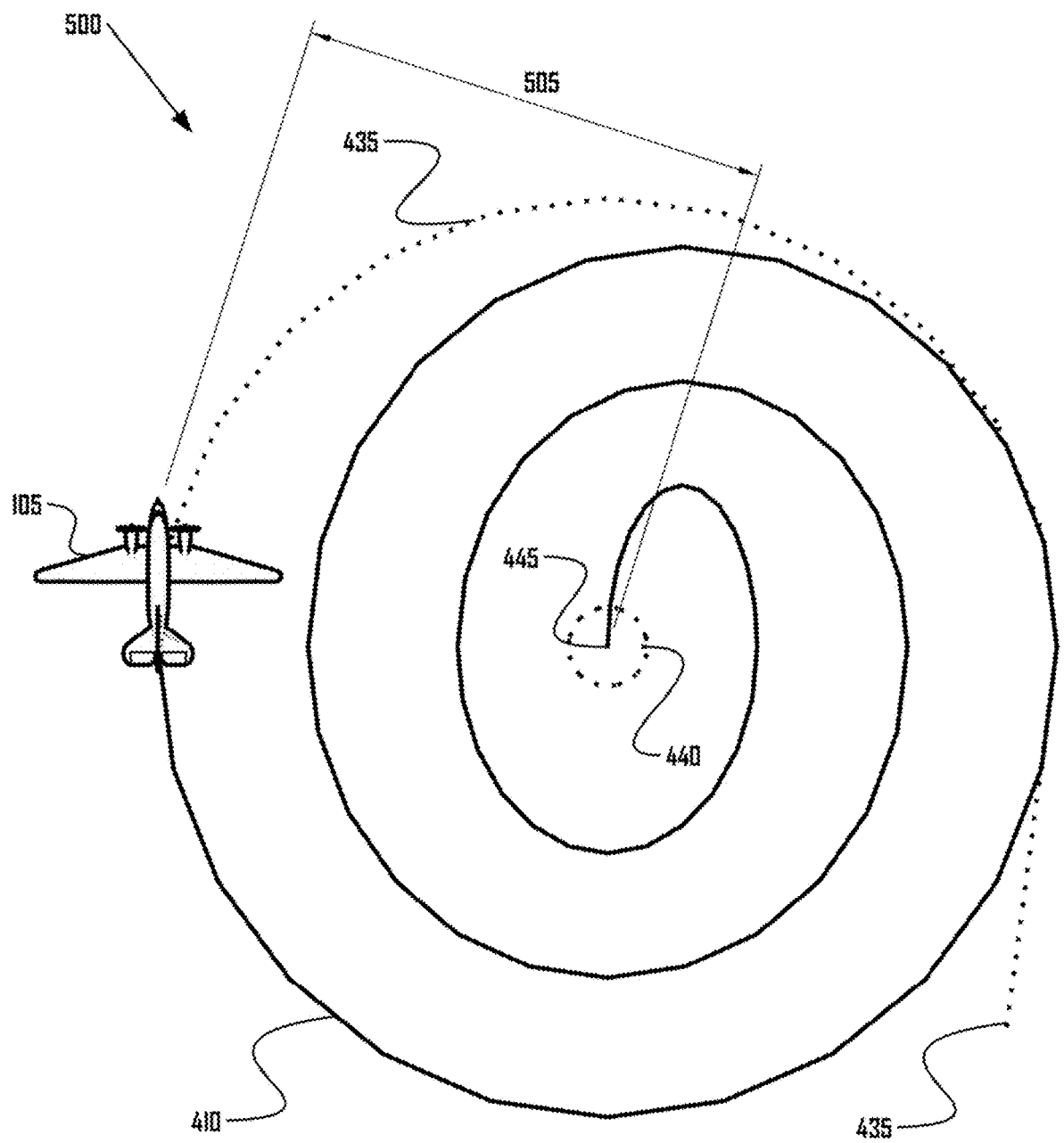
FIG. 5 illustrates a top parallel projection view of the carrier, long line, the path of the carrier, and the location of the load and SLCS of FIG. 4, in accordance with an embodiment.

FIG. 5 illustrates a top parallel projection view 500 of carrier 105, long line 410, current and predicted path of carrier 435, center of orbit 440, SLCS 445, and radius of orbit 505 of FIG. 4, in accordance with an embodiment. Radius of orbit 505 illustrates that radius of orbit 505, as well as a distance between the carrier and the SLCS, a length of long line paid out from hoist, and a height above ground for the SLCS can be determined and or obtained with respect to one or more of carrier 105, SLCS 445, and long line, such as with sensor suite 220 and or sensor suite 320 and or hoist sensor 205. This information can be used in the system model to determine a number of coils and or the shape of long line 410. The shape of long line 410 may be related to a response time among characteristics of the state of the SLCS, the carrier, and the long line, which may be used to influence the position, motion, and orientation of an SLCS and load relative to an objective. For example, operational module 900 may determine that the response time is unsafe and that steps should be taken to avoid minimize perturbation of the states; this may be due, for example, due to a relatively large number of coils in long 410, which may result in increased response time and potential for a bobbing or "yo-yo" effect. So long as a response time warning and or a danger condition are not present, SLCS 445 may be driven within center of orbit 440, such as to achieve fine control of the position, motion, and orientation of SLCS 445.

Figure 6:
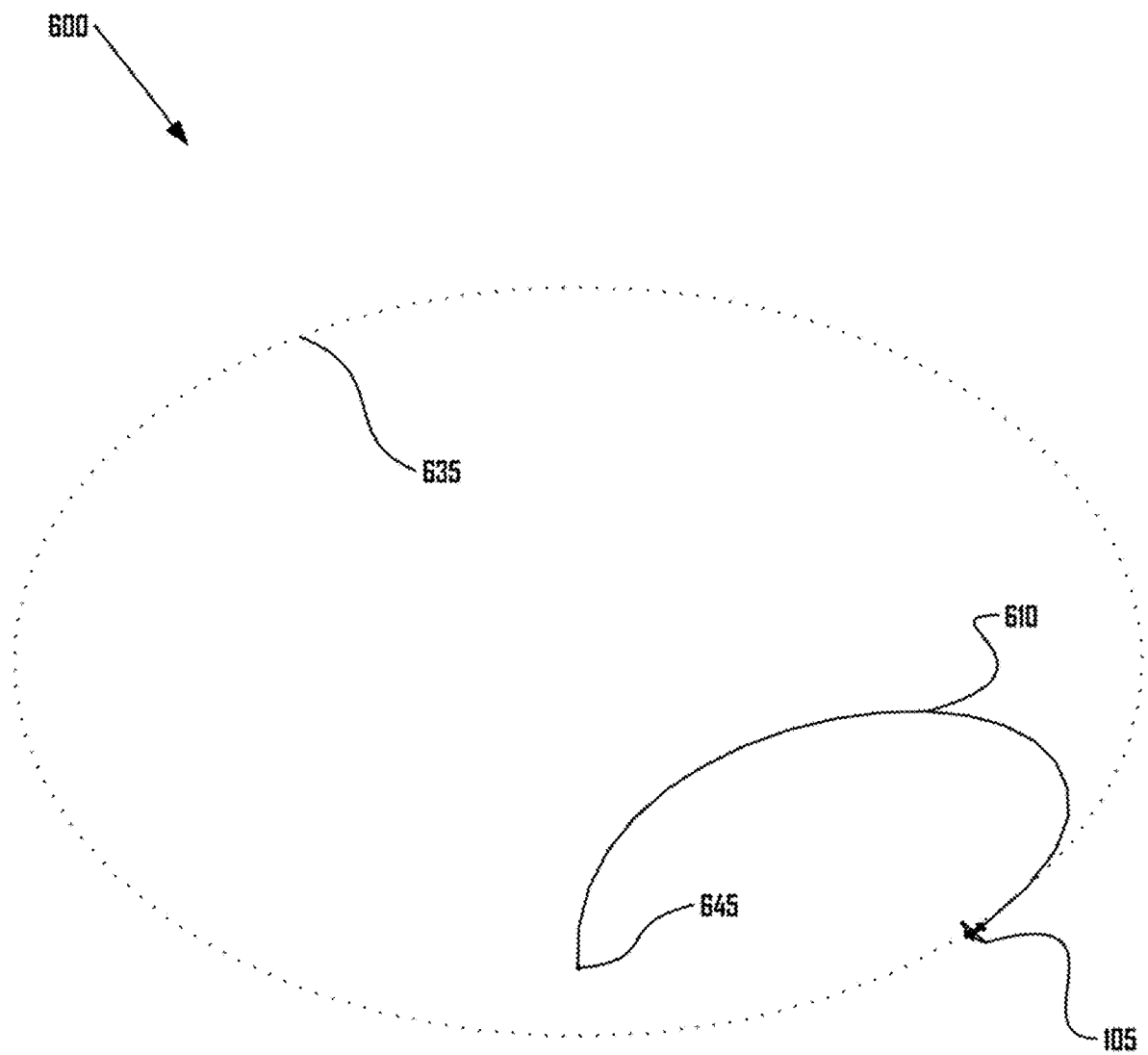
FIG. 6 illustrates a second oblique perspective view of a carrier, a long line, a path of the carrier, and a location of a load and SLCS, in accordance with an embodiment.
Figure 7:
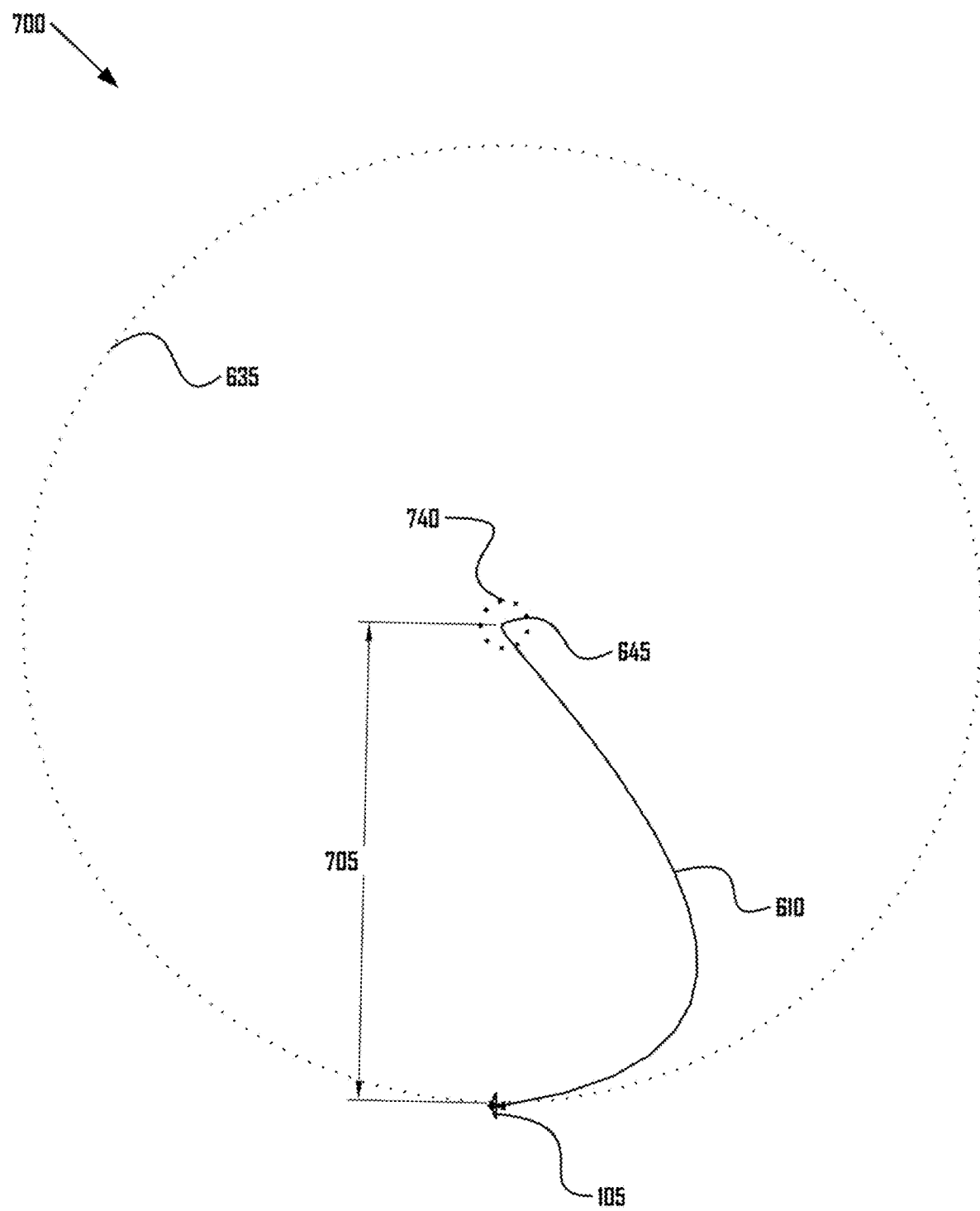
FIG. 7 illustrates a top parallel projection view of the carrier, long line, the path of the carrier, and the location of the load and SLCS of FIG. 6, in accordance with an embodiment.

FIG. 6 illustrates a second oblique perspective view 600 of carrier 105, long line 610, path of the carrier 635, and location of SLCS 645 (and optionally load), in accordance with an embodiment. Location of SLCS 645 may be within a center of orbit (not labeled) of carrier 635. FIG. 7 illustrates a top parallel projection view 700 of carrier 105, long line 610, path of the carrier 635, location of SLCS 645 of FIG. 6, and radius of orbit 705 between carrier 105 and center of orbit or location of SLCS 645 in accordance with an embodiment.

As discussed herein, such physical and logical components of the long line loiter system discussed herein may improve performance of and or may make safer performance of a long line loiter maneuver, such as according to a response time among characteristics of the state of SLCS 645, carrier 105, and long line 610. Radius of orbit 705 illustrates that radius of orbit 705, as well as a distance between the carrier and the SLCS, a length of long line paid out from hoist, and a height above ground for the SLCS can be determined and or obtained with respect to one or more of carrier 105, SLCS 645, and long line 610, such as with sensor suite 220 and or sensor suite 320 and or hoist sensor 205. This information can be used in the system model to determine a number of coils or the shape of long line 610. The shape of long line 610 may be related to a response time among characteristics of the state of the SLCS, the carrier, and the long line, which may be used to influence the position, motion, and orientation of an SLCS and load relative to an objective. For example, operational module 900 may determine that the response time is safe and that steps do not need to be taken to minimize perturbation of the states; this may be due, for example, due to a relatively few number of coils in long 610, which may result in decreased response time and decreased potential for a bobbing or "yo-yo" effect, relative to long line 410. So long as a response time warning and or a danger condition are not present, SLCS 645 may be driven within center of orbit, such as to achieve fine control of the position, motion, and orientation of SLCS 645.

Figure 8:
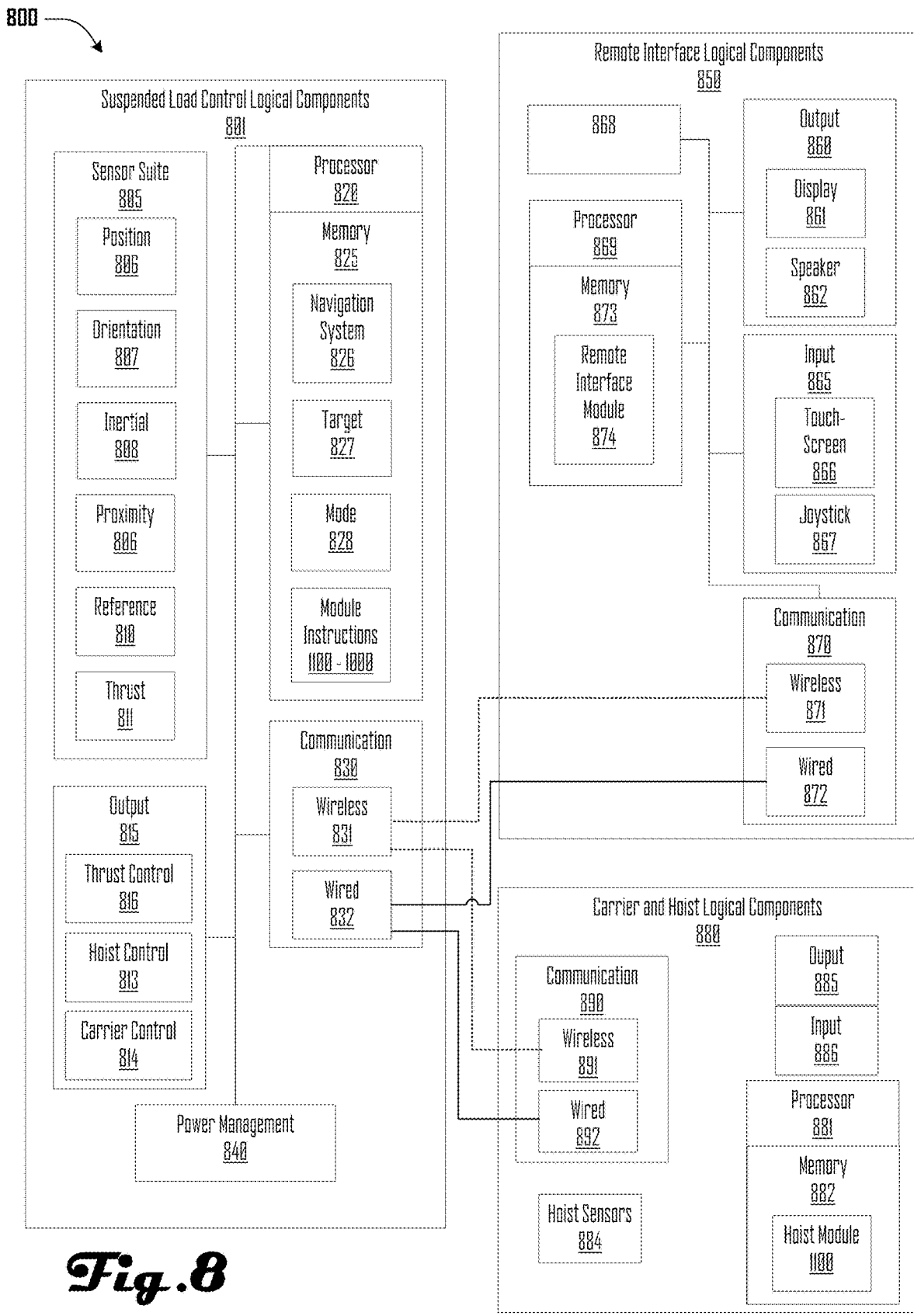
FIG. 8 schematically illustrates operational components of a long line loiter control system including remote interface logical components and hoist logical components, in accordance with an embodiment.

FIG. 8 illustrates suspended load control logical components 801 remote interface logical components 850, and carrier and hoist logical components 880.

As illustrated in the embodiment in FIG. 8, within suspended load control logical components 801 may be sensor suite 805, SLCS processor 820, SLCS memory 825, SLCS communication system 830, SLCS output 815, and power management 840.

Sensor suite 805 may comprise position sensors 806, orientation sensors 807, inertial sensors 808, proximity sensors 809, reference location sensors 810, and thrust sensors 811.

SLCS processor 820, may be one or more processor, microcontrollers, and or central processing units (CPUs). In some embodiments, processors and microcontrollers may be mounted to the same printed circuit board (PCB).

SLCS memory 825 may generally comprise a random-access memory ("RAM"), a read only memory ("ROM"), and a permanent non-transitory mass storage device, such as a disk drive or SDRAM (synchronous dynamic random-access memory).

SLCS memory 825 may store program code for modules and/or software routines, such as, for example, navigation system 826, operational module 900, and long line loiter data fusion and control module 1000, as well as data or information used by modules and/or software routines, such as, for example, target data 827, and mode or command state information 828.

SLCS memory 825 may also store an operating system. These software components may be loaded from a non-transient computer readable storage medium into SLCS memory 825 using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via a network interface.

SLCS memory 825 may also comprise a kernel, kernel space, user space, user protected address space, and a datastore. As noted, SLCS memory 825 may store one or more process or modules (i.e., executing software application(s)). Processes may be stored in user space. A process may include one or more other process. One or more process may execute generally in parallel, i.e., as a plurality of processes and/or a plurality of threads.

The kernel may be configured to provide an interface between user processes and circuitry associated with processor 820. In other words, the kernel may be configured to manage access to processor 820, a chipset, I/O ports and peripheral devices by processes. The kernel may include one or more drivers configured to manage and/or communicate with elements of operational components of deployable equipment (i.e., processor 820, chipsets, I/O ports, and peripheral devices).

SLCS processor 820 may also comprise or communicate via a bus and/or a network interface with SLCS memory 825 or another datastore.

The data groups used by modules or routines in SLCS memory 825 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Deployable equipment communication system(s) 830 may include wireless system(s) 831 such as a wireless transceiver, and wired system(s) 832. SLCS output 815 includes thrust control 816 via thruster controllers. SLCS output 815 includes hoist control 813, to control a hoist. SLCS output 815 includes carrier control 814, such as to control flight control surfaces and actuators of a carrier or to issue flight control instructions to a crew of a carrier. Power managing systems 840 regulate and distribute the power supply from, e.g., batteries. One or more data connectors, data buses, and/or network interfaces may connect the various internal systems and logical components of SLCS 130.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from deployable equipment may be of very low bandwidth and may not be restricted to a frequency or communication protocol. In a distributed computing environment, modules can be located in both local and remote memory storage devices.

Suspended load control logical components 801 may work with a remote positional unit, remote interface, or target node ("remote interface unit") and logical components thereof, such as remote interface logical components 850, and or with a carrier and hoist logical components, such as carrier and hoist logical components 880, in accordance with one embodiment.

In embodiments, the remote interface unit may, for example, be held by an operator or attached to a carrier by magnets, bolts, or any other attachment mechanism. In embodiment, the remote interface unit may be dropped at a location on the ground or attached to, e.g., a life preserver or other flotational device, a rescuer, a load to be picked up, a location for a load to be delivered, or an operational specific location.

In embodiments, the remote interface logical components 850 may convey input from an operator to suspended load control logical components 801, such as command states and operational instructions to operational module 1100 and or to hoist for long line loiter operational module 1100. In embodiments, remote interface logical components 850 may convey information or data from carrier and hoist logical components 880 to suspended load control logical components 801 and or to an operator, such as a status of the hoist, a length of long line paid out, a force or mass on the hoist from the long line, and the like.

Remote interface logical components 850 may be in communication with suspended load control logical components 801 and or with carrier and hoist logical components 880 via communication systems 870, which may be wireless 871 or wired 872. Output 860 from remote interface logical components 850 may include information displayed on screen 861, and audio 862. Input 865 to remote interface logical components 850 to control SLCS 130 or hoist may include commands conveyed through touchscreen 866, joystick 867, a microphone, a camera, one or more buttons, or the like. In various embodiments, remote interface logical components 850 may comprise one or more physical and/or logical devices that collectively provide the functions described herein. An example of an embodiment of remote interface logical components 850 is illustrated and discussed in FIG. 12A, FIG. 12B, FIG. 13A, FIG. 13B, and FIG. 13C.

Remote interface logical components 850 may further comprise processor 869 and memory 873, which may be similar to processor 820 and memory 825. Memory 873 may comprise software or firmware code, instructions, or logic for one or more modules used by the remote positional unit, such as remote interface module 874. For example, remote interface module 874 may provide control and interface for a remote interface, such as to allow it to be turned on and off, to pair it with an SLCS or hoist, to input instructions, or the like.

In embodiments, remote interface logical components 850 may comprise a sensor suite or beacon configured to communicate, such as wirelessly, with suspended load control logical components 801 to provide, for example, a position reference. If SLCS 130 is considered a primary sensor suite, a secondary sensor suite location can be in the platform or carrier from which a long line is suspended, and a tertiary sensor suite location can be at a target location (e.g., to provide location information for the target location).

Also illustrated in FIG. 8 are carrier and hoist logical components 880. Carrier and hoist logical components 880 may comprise processor 881 and memory 882, which may be similar to processor 820 and memory 825. Memory 882 may comprise software or firmware code, instructions, or logic for one or more modules used by a hoist, such as hoist for long line loiter operational module 1100. For example, hoist for long line loiter operational module 1100 may pair a hoist with an SLCS, with a carrier, may output sensor data of the hoist to the SLCS, and may receive and act on local and remote instructions, such as to reel in or reel out long line, or the like.

Carrier and hoist logical components 880 may be in communication with suspended load control logical components 801 via communication system 890, which may comprise wireless 891 or wired 892 transceivers. Output 885 from carrier and hoist logical components 880 may include information or data from, for example, hoist sensors 884, such as, for example, a cable length encoder, a reel torque encoder, a cable presence sensor (to sense presence of a long line in a hoist), stain gauges, equipment temperature sensors, power sensors, and the like. Input 886 to carrier and hoist logical components 880 to control the hoist and or carrier may include commands from suspended load control logical components 801 and modules, thereof, such as operational module 900 and long line loiter data fusion and control module 1000. Input 886 to carrier and hoist logical components 880 to control the hoist and or carrier may also include commands from human operators, which commands may be conveyed through, for example, remote interface logical components 850, such as touchscreen 866, a joystick 867, a microphone, a camera, one or more buttons, or the like.

Figure 9:
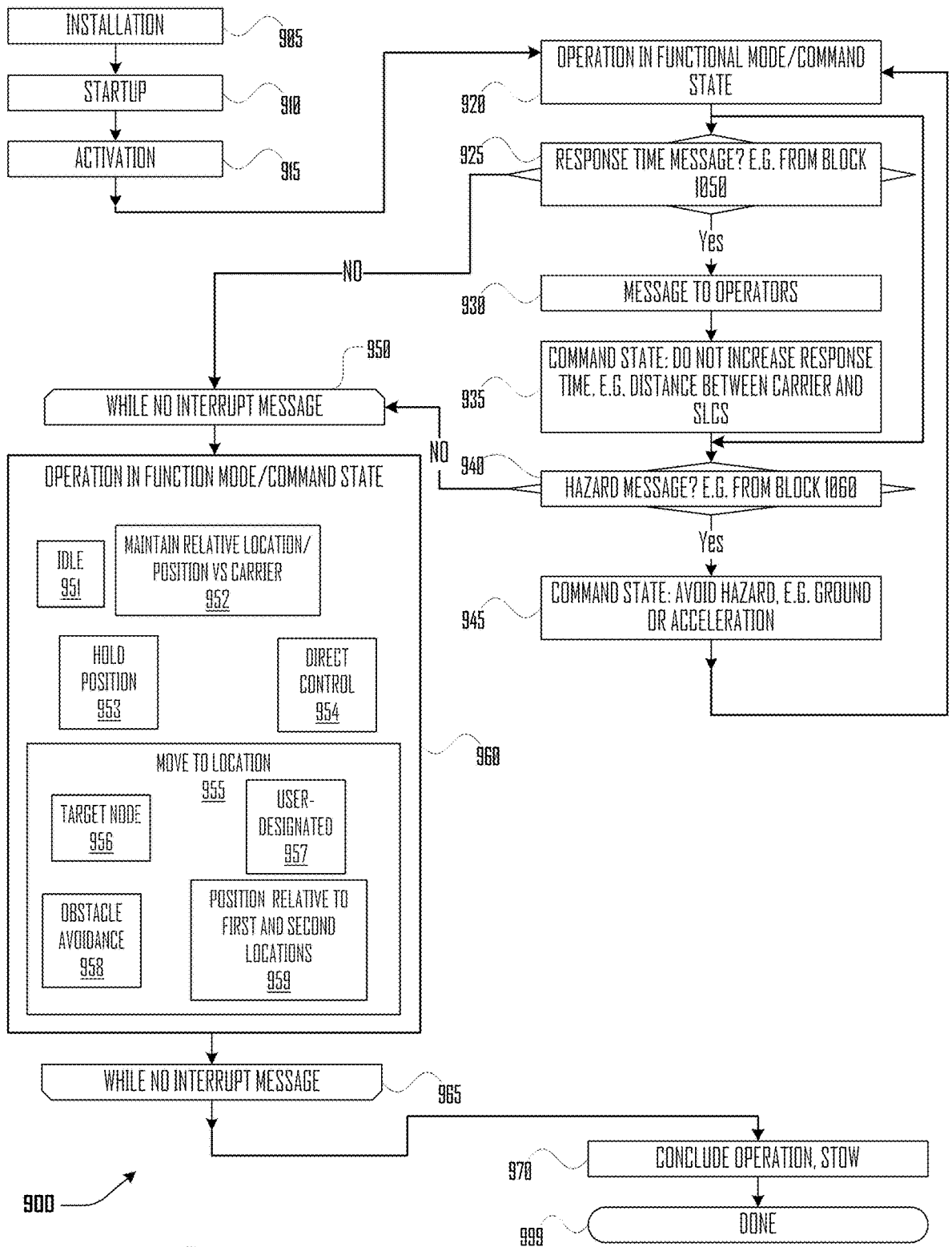
FIG. 9 illustrates an operational module of a long line loiter system including multiple modes or command states in accordance with an embodiment.

FIG. 9 illustrates operational module 900 of an SLCS, such as of SLCS 130, including multiple modes or command states in accordance with one embodiment. Instructions of, or which embody, operational module 900 may be stored in, for example, SLCS memory 825, and may be executed or performed by, for example, SLCS processor 820, as well as by electrical circuits, firmware, and other computer and logical hardware of deployable equipment with which operational module 900 may interact.

In block 905, an SLCS may be installed into onto a long line. When installed, the lone line may be inserted into a channel in the SLCS. In embodiments, installment may be aided or managed by operational module 900. For example, operational module 900 may be instructed to or may open the channel for the long line in the SLCS. For example, operational module 900 may sense the presence of a long line within the channel, such as with sensors 805. For example, operational module 900 may or may be instructed to close the channel for the long line, such as through the activation of a clamp.

In block 910, the SLCS may be started up, such as by the press of a button or lever on the SLCS. In conjunction with the button or lever which may initialize the system, another button or lever may cause immediate system shutdown when pressed. The system may also be started or stopped by an operator or process not directly next to the system, e.g., remotely by pressing a button or activating on one or more remote interface logical components 850 linked wirelessly to the SLCS.

In block 915, operational module 900 may be activated and or initialized.

In block 920, operational module 900 may receive one or more functional modes or command states selected by an operator or a process and may proceed to block 925. From block 920, operational module 900 may proceed to one or both of decision block 925 and or decision block 940.

At decision block 925, operational module 900 may determine whether a response time message has been received; e.g., from block 1050 of long line loiter data fusion and control module 1000. The response time message may indicate that a response time between state conditions of the carrier, of the hoist, and of the SLCS which are not within a safety margin.

For example, as the SLCS is being lowered, there should be a relationship between a length of long line paid out from hoist and a distance between the carrier and the SLCS. This relationship may start with a 1:1 relationship, between length of long line paid out and distance between the carrier and the SLCS. However, as the long line coils into a spiral, the relationship may change, such that as more long line is paid out by the hoist, the distance between the carrier and the SLCS increases at a slower rate, resulting in a longer response time between state conditions of the carrier, of the hoist, and of the SLCS. For example, the response time may be longer with respect to spiral 410, which contains more coils and have a lower apparent spring force than spiral 610. Long line loiter data fusion and control module 1000 may allow for a certain amount of change and or a rate of change in the response time and, when the amount or rate of change in response time exceeds a safety margin or threshold, may send a message to operational module 900, which message may be received at decisions block 925.

At block 930, if affirmative or equivalent at decision block 925, operational module 900 may output a message to operators, such as to crew of a carrier, operators of a drone, crew or personnel at a target location, or the like.

At block 935, operational module 900 may enter a command state in which the long line loiter system attempts to not increase or reduce the response time. Operational module 900 may execute the functional mode or command state by calling and performance of long line loiter data fusion and control module 1000 as a subroutine or submodule, to implement the functional mode or command state and to conclude the functional mode or command. For example, the command state may cause long line loiter data fusion and control module 1000 to hold, slow increase in, or to decrease a distance between the carrier and the SLCS and load. For example, the command state may cause long line loiter data fusion and control module 1000 to decrease a rate of release of long line from the hoist, to stop releasing long line from the hoist, or may cause the hoist to reel in the long line, or may control the carrier or may issue instructions to carrier crew to hold or increase an elevation of the carrier or to hold or increase a speed of the carrier. For example, the command state may cause long line loiter data fusion and control module 1000 to control thrusters of the SLCS to not increase a distance between the carrier and the SLCS and load. For example, the command state instruction may comprise a desired rate of acceleration, a desired elevation of the SLCS, a desired orientation of the SLCS, a desired location of the SLCS.

At decision block 940, operational module 900 may determine whether a hazard message has been received; e.g., from block 1060 of long line loiter data fusion and control module 1000. The hazard message may indicate that an impact with ground or other object and or excessive acceleration is predicted or has occurred. Excessive acceleration may occur due to bobbing or due to a "whip-lash" effect; e.g., a whip-lash effect as may occur when the carrier transitions from orbiting a target location to moving toward a destination.

If affirmative or equivalent at decision block 940, at block 945 operation module 900 may enter a command state in which the long line loiter system attempts to avoid the hazard. Operational module 900 may execute the functional mode or command state by calling and performance of long line loiter data fusion and control module 1000 as a subroutine or submodule, to implement the functional mode or command state and to conclude the functional mode or command. To avoid the hazard may comprise long line loiter data fusion and control module 1000 issuing instructions to control thrusters of the SLCS to maneuver to avoid the hazard, such as if the hazard is an obstacle above the ground. To avoid the hazard may comprise long line loiter data fusion and control module 1000 issuing instruction to control the hoist to decrease a length of long line to avoid hitting the ground. To avoid the hazard may comprise long line loiter data fusion and control module 1000 issuing instruction to control the hoist to increase a length of long line to lessen high acceleration. To avoid the hazard may comprise long line loiter data fusion and control module 1000 controlling the carrier, such as a drone, or issuing flight control instructions to crew of the carrier to change a center of orbit of the carrier, to change a bank angle, altitude, or velocity of the carrier to avoid the hazard. For example, the command state instruction may comprise a desired rate of acceleration, a desired elevation of the SLCS, a desired orientation of the SLCS, a desired location of the SLCS, a location toward which the SLCS should not move, and the like.

Following block 935 and or block 945, operational module 900 may return to block 920, and may allow a period of time, to determine if the response time has return to an acceptable level or if the hazard condition is no longer present.

If negative or equivalent at decision block 925 and or decision block 940, operational module 900 may enter opening loop block 950 to closing loop block 965. Operational module 900 may stay between opening loop block 950 to closing loop block 965 until an interrupt message is received. An interrupt message may comprise, for example, conclusion of a command state or a problem message, such as a response time message or a hazard message.

In block 960 operational module 900 may perform or call long line loiter data fusion and control module 1000 as a subroutine or submodule, to implement a functional mode or command state. The functional mode or command state may be selected by a human, such as using a remote interface, and or may be selected by a process. Output of block 960, e.g., a functional mode or command state instruction, may comprise a desired rate of acceleration, a desired elevation of the SLCS, a desired orientation of the SLCS, a desired location of the SLCS, a location toward which the SLCS should not move, and the like.

The functional modes or command states of the system are:

Idle mode 951: all internal systems of SLCS are operating (e.g., operational module 900 observes its motion and calculates control or other actions), but the thrusters and hoist are shut off, maintain an idle speed only, or maintain a hoist at a then-current cable extension, without action to affect the motion of the load.

Maintain relative position vs. carrier mode 952: Operational module 900 activates thrusters and or hoist to stabilize an SLCS with respect to a carrier or a target location at a center of orbit of the carrier. For example, when the SLCS is at a target location, operational module 900 may activate thrusters and or hoist to cause the SLCS to at the target location, notwithstanding drift which may otherwise occur. This may be accomplished by, for example, rotating the SLCS, such as with one thruster in one thrust unit group or opposing thrusters in two thrust unit groups, such that the SLCS is oriented along a heading, and then applying thrust from two thrusters in on a same side of the SLCS in the two thrust unit groups to propel the SLCS and load along the heading. For example, when the SLCS is suspended below a fixed-wing aircraft, operational module 900 may activate thrusters and hoist to stay at an elevation relative to the carrier, such as to counteract "yo-yo" effect, and to stay at a center of an orbit of the carrier. Operational module 900 localizes the carrier motion, determines elastic or other behavior of the long line, such as according to an elastic modulus of the long line, and or determines aerodynamic forces on the long line, and performs corrective actions with thrusters and hoist necessary to maintain position of the SLCS and load relative to the carrier. If the center of orbit of the carrier and the target location is traveling at a low speed, operational module 900 will couple velocity of the SLCS with the carrier using the thrusters and hoist so the two entities move in unison. Upon a disturbance to the load or motion of the SLCS, operational module 900 provides thrust or activates the hoist opposite the direction of the disturbance to counteract the disturbance, eliminating swing, "yo-yo" effects caused be elasticity of the long line and or aerodynamic forces on the long line, or spirals in the long line (which may be caused by the carrier orbiting the load), or other undesired motion.

Move to/stop at position mode 955: Operational module 900 will stabilize the SLCS to a fixed position, counteracting influence of the weather, small movements of the carrier, or changes in the elevation of the SLCS relative to the carrier. This mode has the effect of negating all motion. In this mode, an operator or another process can send the desired target position to the SLCS via remote interface logical components 850. This can be accomplished in at least the following ways:

Target node position 956: The operator can place a remote positional unit, remote interface, or target at the desired drop off or pickup location. The remote positional unit will communicate wirelessly with operational module 900 to indicate the desired position, and operational module 900 responds by controlling the carrier or issuing flight instructions to the carrier to orbit the target location and to activate thrusters and hoist to maneuver the SLCS and load to the desired location. This mode may further hold a desired tension on the long line. The remote interface logical components 850 may receive and display location information of entities.

User-designated position 957: An operator or process can use the remote interface logical components 850 to send a designated location (e.g., latitude and longitude coordinates, selection of a location on a map or in an image, etc.) to operational module 900. Operational module 900 will then, if the SLCS and load are already at the location, control the carrier or issue flight instructions to the carrier to orbit the target location use the thrusters of the SLCS and or hoist to hold the SLCS and suspended load at the designated location. If the SLCS and load are not at the location, operational module 900 may control the carrier or issue flight instructions to the carrier to orbit the target location and use the thrusters of the SLCS and or hoist to maneuver the SLCS and suspended load to the designated location. This mode may further hold a desired tension on the long line. Operational module 900 may simultaneously send information or data to the remote interface logical components 850 regarding, for example, position, distance, elevation, and long line tension information for display or communication to an operator, process, or others.

Hold position mode 953: Operational module 900 will resist all motion and attempt to maintain a current location of the SLCS independent of the carrier's motion, using thrusters and hoist. This mode has the effect of dampening all motion of the SLCS. This mode has conditional responses relative respectively to carrier speed, center of orbit of the carrier, safety factors, and physical constraints. For example, this mode may only be able to hold a position of the SLCS for a relatively short time after the carrier changes its center of orbit.

Direct control mode 954: Joystick or other direct operation of the thrusters, hoist, and carrier in three degrees of freedom (e.g., in x-, y-, and z-axis) as well as rotation. Though operational module 900 may be entirely closed-loop and may not require external control during operation, there is an option for direct user control of the thrusters, hoist, and carrier. An operator is able to directly control position, rotation, thruster output level, long line length, or long line tension, as well as to directly control the carrier or issue flight instructions to the carrier. Direct control of the carrier or flight instructions to the carrier may be through direct control of the carrier or through selection of a center of orbit or target location of the carrier.

Obstacle avoidance 958: operational module 900 identifies a path of the SLCS and load, identifies objects in the path, determines position, rotation, thruster output level, and long line length which may avoid the obstacle, and outputs instructions to thrusters and or hoist and or the carrier to avoid the obstacle. For example, obstacle avoidance module 958 module may receive and process sensor information such as to i) to equalize the distance between sensor locations, such as at fan units and objects, such as obstacles, sensed in the environment or ii) to measure or receive geometry of a load, measure geometry of obstacles sensed in the environment, determine or receive the position, orientation, and motion of the load, and negotiate the load relative to the obstacle.

Position relative to first and second locations mode 959: An operator or process can use, for example, use remote interface logical components 850 to designate a first position (e.g., pickup or drop off location) to operational module 900; the operator or process may further designate a second location, such as a location of a carrier, a location on the ground, etc., and may also designate a desired rate of change between the first and second locations. This may comprise, for example, a moving center of orbit of the carrier. Operational module 900 activates thrusters of the SLCS, the hoist, and controls the carrier, such as a drone, or issues flight control instructions to the carrier to move the SLCS from the first location to the second location. The rate of change may be based on percentage of a maximum rate of change operational module 900 can achieve, whether designated by an operator or otherwise. This mode may further hold a desired tension on the long line.

Block 965 may conclude when an operator or process determines that the functional mode or command state has been completed, such as by obtaining a desired location, such as by a command from the operator or process to conclude the functional mode or command state, or such as by an interrupt condition, such as a loss of power, or the like.

In block 970, operational module 900 may activate the hoist to bring the SLCS and load up to the carrier or to another designated position and may activate thrusters to rotate the SLCS to an orientation compatible with being lifted to the carrier or the designated position. Operational module 900 may detect when the SLCS is in the hoist or at the designated position, detect engagement of interlocking structures of the hoist and with the SLCS, and detect engagement of locking structures and locking together of interlocking structures. Operational module 900 may detect engagement of the SLCS with an interface for the SLCS and may activate communication, power, and other services of the interface for the SLCS. If the SLCS includes collapsible arms or other components, they may be folded. Thrusters and other components may be powered down. Cable retention components, such as clamps or fingers, may be released. The SLCS may be disengaged from terminal equipment of the long line and or from the long line. A load may be detached from a load hook. The long line may be detached from a hoist ring at a top of the SLCS. A stow cable or other securement may be secured to the SLCS. The SLCS may be stowed in a charger or other location.

At done block 999, if not performed at block 970, operational module 900 may be shut down, such as by activation of a button or other control on SLCS 130, on an interactive display, or on remote interface of SLCS 130.

Figure 10:
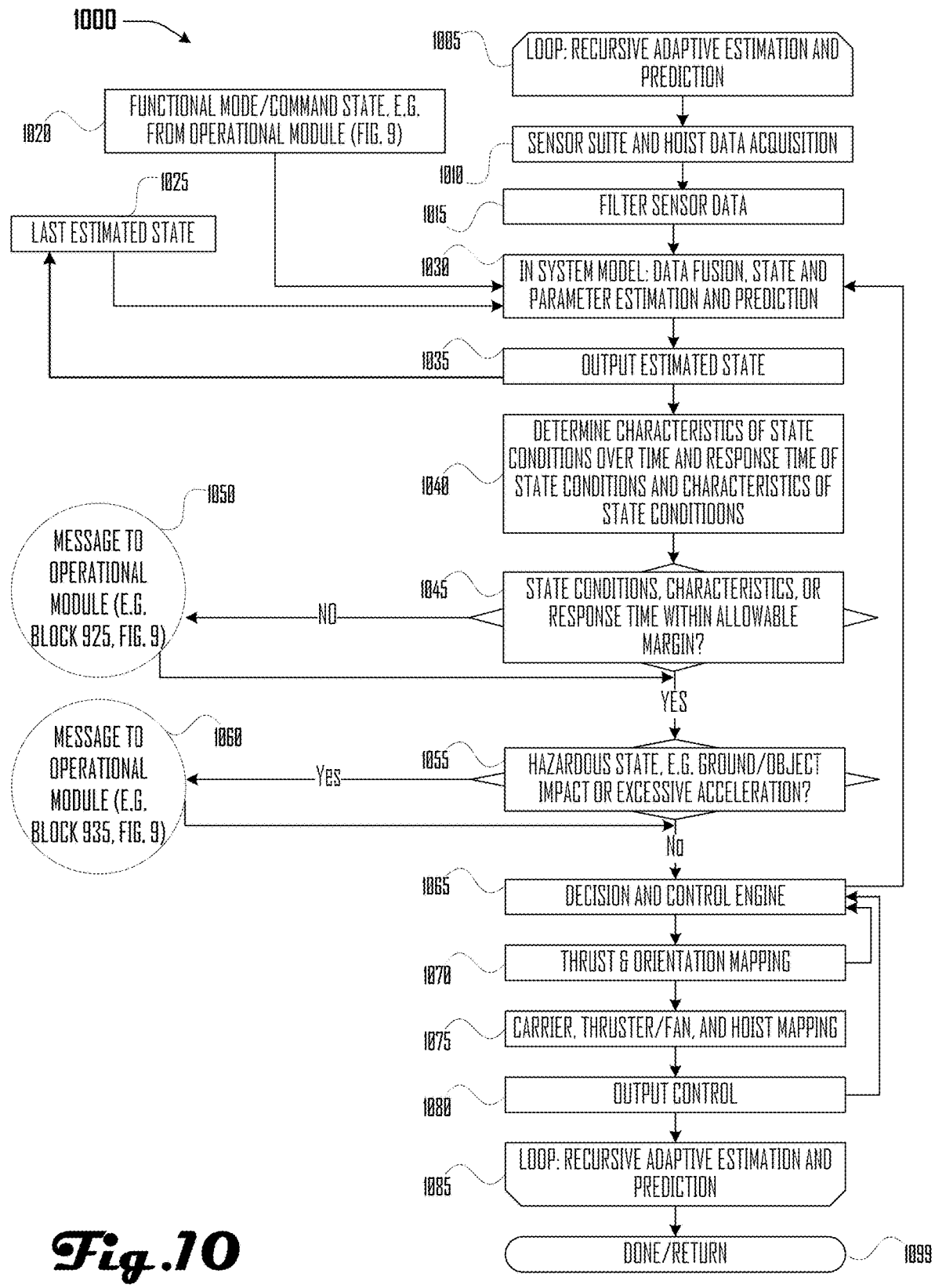
FIG. 10 illustrates long line loiter data fusion and control module of a long line loiter control system in accordance with an embodiment.

FIG. 10 illustrates long line loiter data fusion and control module 1000, in accordance with one embodiment. Instructions of, or which embody, long line loiter data fusion and control module 1000 may be stored in, for example, SLCS memory 825 or in memory in a computer processor of a carrier, and may be executed or performed by, for example, SLCS processor 820 or a processor of a carrier, including by electrical circuits, firmware, and other computer and logical hardware of deployable equipment, carrier and hoist logical components 880, and remote interface logical components 850 with which long line loiter data fusion and control module 1000 may interact.

Long line loiter data fusion and control module 1000 may operate in a closed iterative loop to determine position and motion of the SLCS and carrier in near real time, determine a state of a long line, and perform a set of calculations to determine the most desired system response, and send desired response(s) to the air propulsion system thruster array, to a hoist of the carrier, and or to the carrier control a long line loiter maneuver. This process may be continuous while the system has power.

Opening loop block 1005 to closing loop block 1085 may iterate, so long as long line loiter data fusion and control module 1000 is active, such as when a functional mode or command state is active (e.g., when called by operational module 900).

At block 1010, long line loiter data fusion and control module 1000 may perform data acquisition with respect to a sensors in the SLCS, the carrier, and the hoist including (but not limited to) sensor suites therein, such as sensor suites comprising cameras, accelerometers, gyroscopes, magnetometer, inclinometer, directional encoder, radio frequency relative bearing system, gravitational sensors, microelectromechanical systems (MEMS) sensors, Global Positioning System (GPS), lidar/radar, machine vision, range finders, ultrasonic proximity sensors (e.g. sensors of sensor suite 805). As noted, the hoist sensor may provide information or data regarding a length of long line, a tension or torque on the hoist or reel therein, a mass on the hoist or reel therein, or the like. This raw data or information, however, may be subject to noise, out-of-range values, and other errors and uncertainty.

At block 1015, long line loiter data fusion and control module 1000 may further filter the acquired data or information for out-of-range values, frequency oscillations, and the like.

At block 1020, long line loiter data fusion and control module 1000 may obtain a functional mode or command state, such as from operational module 900, such as from a user, process, or operator selected functional mode or command state; e.g., from one or more of block 935, block 945, and or block 955. The command state may comprise coordinates, elevation, desired rates, and the like.

At block 1025, long line loiter data fusion and control module 1000 may obtain a previously estimated state, such as from block 1035.

At block 1030, long line loiter data fusion and control module 1000 combines data or information from the sensors and hoist of block 1010 with the functional mode or command state from block 1020 and the previously estimated state of the system model from block 1025 in a system model, also described as a data fusion or as an online state estimation and prediction. Block 1030 determines a deviation from the currently measured state, from the data or information from the sensors and hoist of block 1015, and the previously estimated state of block 1025. Block 1030 estimates a current state of the system, such as, for example, position, location, and orientation of the SLCS and carrier, mass or weight of the SLCS and load, length of long line, distance between the carrier and the SLCS, distance above ground of the SLCS, aerodynamic forces on the long line, distance between the carrier and the SLCS, and moment of inertia of SLCS (and load).

Block 1030 further predicts a near-term future state of the system, such as, for example, position (including elevation), orientation, motion, environmental disturbances or influences and the like. This block compares the current state to a previously predicted state and determines a deviation between the current state and the predicted state.

In the system model used in block 1030, sensor data may be processed by the system model using, for example, non-linear flavors of, for example, a Kalman Filter, such as an Unscented Kalman Filter ("UKF"), to predict the near-term future state of the system and to estimate the current state of the system. Closed-loop, iterative control methods performed in this block may include fuzzy-tuned proportional, integral, and derivative feedback controllers which have bidirectional communication with advanced control methods including deep learning neural nets and future propagated Kalman filters, allowing for real-time (or "online") system identification. Block 1030 may be able to estimate current or predict near-term state without data or information from hoist and or from the carrier and sensor suites therein. However, with data or information from hoist and carrier, the state estimation and prediction of block 1030 may be improved.

At block 1040, long line loiter data fusion and control module 1000 may determine characters of change of state conditions over time, and response times among the state conditions of the SLCS, the carrier, and the long line, such as change in length of long line, movement of the SLCS over time through an absolute coordinate space, movement of the carrier over time through the absolute coordinate space, change in orientation (e.g. rotation) of SLCS over time in the absolute coordinate space, as well as response time between, for example, the movement of the SLCS and the carrier over time through the absolute coordinate space, response time for change in position of the carrier and the SLCS over time, and response time for change in length of long line paid in or out of the hoist and position of the SLCS relative to the carrier, offset in position and orientation between the SLCS and the carrier relative to the target location or orbital center, distance traversed in an orbital period for the SLCS and the carrier, change in distance traversed in the orbital period for the SLCS and the carrier, height above ground level of the SLCS, and the like. Such characteristics may be determined by determining integrals of such state conditions over time.

At decision block 1045, long line loiter data fusion and control module 1000 may determine whether one or more of the state conditions, the characteristics of change of state conditions over time, and response times among the state conditions of the SLCS, the carrier, and the long line are within an allowable margin. For example, as an SLCS is paid out of a carrier on a long line by a hoist, the response time between change in the length of the long line and position of SLCS relative to the carrier may change, such as due to aerodynamic force on the long line and the development of a portion of or one or more coils in a 3-dimensional spiral. For example, long line 410 in FIG. 4 and FIG. 5 has developed more coils in its 3-dimensional spiral than long line 610 in FIG. 6 and FIG. 7. This may be due to differences in speed of carrier 105 between FIG. 4 and FIG. 5 relative to FIG. 6 and FIG. 7, differences in the orbital distance differences between length of long line 410 and long line 610, differences in aerodynamic forces on long line 410 and SLCS 440 and long line 610 and SLCS 640, and or differences in mass of SLCS 440 and SLCS 640.

In general, a faster moving carrier, orbiting a greater distance from a center of orbit, with a longer long line, with a long line subject to greater aerodynamic forces (such as due to a thickness of long line), will produce a long line with more coils in its 3-dimensional spiral. In general, a long line with more coils in its 3-dimensional spiral will exhibit slower response time among the characteristics of the state of the SLCS, the carrier, and the long line over time. In general, slower response time is more likely to produce dangerous non-linear instability among the components of a long line maneuver, such as "yo-yo" or bobbing. In general, slower response time between change in length of long line and position of the SLCS relative to the carrier is more likely to result in whiplash or excessive acceleration of the SLCS as the carrier exits an orbital path.

The system model may thereby be used to determine state conditions of the components of the long line loiter system, characteristics of the state conditions over time, and response time among the state conditions and characteristics of the state conditions over time.

If negative or equivalent at decision block 1045, at block 1050, long line loiter data fusion and control module 1000 may transmit a message to operation module 900, e.g., to block 925, or the equivalent to indicate that response time is not within a safety or other allowable margin.

If affirmative or equivalent at decision block 1045, at decision block 1055, long line loiter data fusion and control module 1000 may determine whether a hazardous state has or may occur. The hazardous state may comprise, for example, one or more of an impact with an object, such as with the ground or another object in the environment, an excessive acceleration, or the like.

If affirmative or equivalent at decision block 1055, at block 1060, long line loiter data fusion and control module 1000 may transmit a message to operation module 900, e.g., to block 935, or the equivalent to indicate that the hazardous state has or may occur.

At block 1065, long line loiter data fusion and control module 1000 may take state estimation and state prediction and the deviation between the current state and the previously predicted state, informed by the user-selected or process-selected functional mode or command state 1025, as well as additional feedback from the thrust and orientation mapping 1070 and output control 1080, and decides how the carrier should move, how the hoist should control the long line, and how the SLCS should move to achieve the functional mode or command state input of block 1020, such as by outputting force from thrusters, reeling in or paying out long line from the or hoist, or controlling or issuing flight control instructions to the carrier.

At block 1070, algorithmic output is sent to motion controllers from which the desired thrust response will be sent to the electric duct fans or thrusters via phase control, to the hoist for output to a reel motor, and or to the carrier and thrust and flight control surfaces of the carrier. The net thrust output is mapped in real-time through encoders and load cells then sent back to the hoist, the carrier, and thrust controllers for closed-loop control.

At block 1075, long line loiter data fusion and control module 1000 maps how the SLCS should move to the carrier, the hoist, and to thrusters of the SLCS to generate a carrier, thruster (or "fan"), and hoist mapping to control the carrier, hoist, thrusters, and hoist to achieve the desired orientation, elevation, and thrust of the carrier and of the SLCS in the long line maneuver.

At block 1080, long line loiter data fusion and control module 1000 applies the carrier, thruster, and hoist mapping to output control signals to the carrier, or to the hoist, to the fans or thrusters (or electronic components controlling or controlled by the same) to achieve the determined position, thrust, and orientation of SLCS, exerting commanded control output and implementing a dynamic response in the form of control of the carrier, thrust from the fans, and reeling in or paying out of the long line by the hoist.

At done block 1099, long line loiter data fusion and control module 1000 may conclude or return to a module which may have called it.

Figure 11:
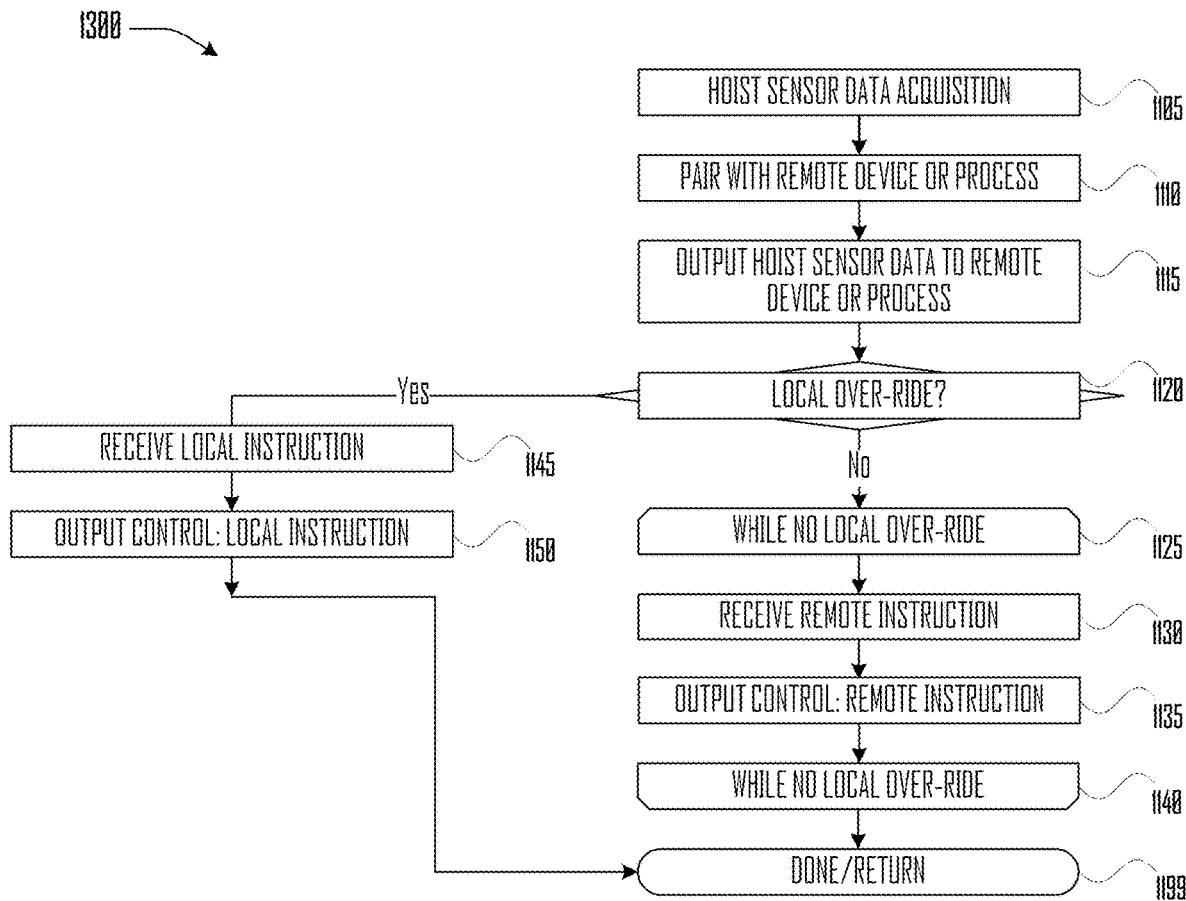
FIG. 11 illustrates hoist for long line loiter operational module, in accordance with an embodiment.

FIG. 11 illustrates hoist for long line loiter operational module 1100, in accordance with one embodiment. Instructions of, or which embody, hoist for long line loiter operational module 1100 may be stored in, for example, hoist memory 882, and may be executed or performed by, for example, hoist processor 881, as well as by electrical circuits, firmware, and other computer and logical hardware of hoist, carrier and hoist logical components 880, and remote interface logical components 850 with which long line loiter data fusion and control module 1000 may interact.

At block 1105, hoist for long line loiter operational module 1100 may obtain information or data from sensors of a hoist, such as hoist sensors 884.

At block 1110, hoist for long line loiter operational module 1100 may pair itself and its hoist and or with a remote device or process. Pairing may require authentication and authorization in one or both devices or processes.

At block 1115 hoist for long line loiter operational module 1100 may output hoist sensor data or information to the paired remote device or process.

At decision block 1120 may determine whether it is to act on local or remote instructions. For example, hoist for long line loiter operational module 1100 may act on remote instructions unless local instructions are received, in which case a local over-ride may be activated.

If negative or equivalent at decision block 1120, hoist for long line loiter operational module 1100 may proceed to opening loop block 1125. Hoist for long line loiter operational module 1100 may iterate over opening loop block 1125 to closing loop block 1140.

At block 1130, hoist for long line loiter operational module 1100 may receive a remote instruction, such as an instruction from operational module 900, from long line loiter data fusion and control module 1000, from a remote interface, or the like. The instruction may be, for example, an instruction to pay out long line, reel in long line, or maintain a tension or other force on the long line. The instruction may be to pay out or reel in a specified amount of cable to or pay out or reel in until another instruction is received to stop. The instruction may specific a rate at which the reel is to be operated and or a maximum or minimum tension or other force to be achieved by the reel. Hoist for long line loiter operational module 1100 may determine a minimum or maximum tension, rate, or force. The instruction may be to activate actuators of the hoist, such as actuators to deploy an SLCS from the hoist or to secure SLCS 130 to the hoist.

At block 1135, hoist for long line loiter operational module 1100 may output control to implement the remote instruction, such as to pay out long line, reel in long line, or maintain the tension or other force on the long line, or the like.

At block 1145, which may follow an affirmative or equivalent decision at decision block 1320, hoist for long line loiter operational module 1100 may receive a local instruction, such as an instruction from a crew of a carrier or an interface of the hoist which is given a higher priority than an instruction from another source. The instruction may be, for example, an instruction to pay out long line, reel in long line, or maintain a tension or other force on the long line. The instruction may be to pay out or reel in a specified amount of cable to or pay out or reel in until another instruction is received to stop. The instruction may specific a rate at which the reel is to be operated and or a maximum or minimum tension or other force to be achieved by the reel. Hoist for long line loiter operational module 1100 may determine a minimum or maximum tension, rate, or force. The instruction may be to activate actuators of the hoist, such as actuators to deploy an SLCS from the hoist or to secure the SLCS to the hoist.

At done block 1199, hoist for long line loiter operational module 1100 may conclude, may shut down the hoist, and or may return to a process which may have called it.

Figure 12A:
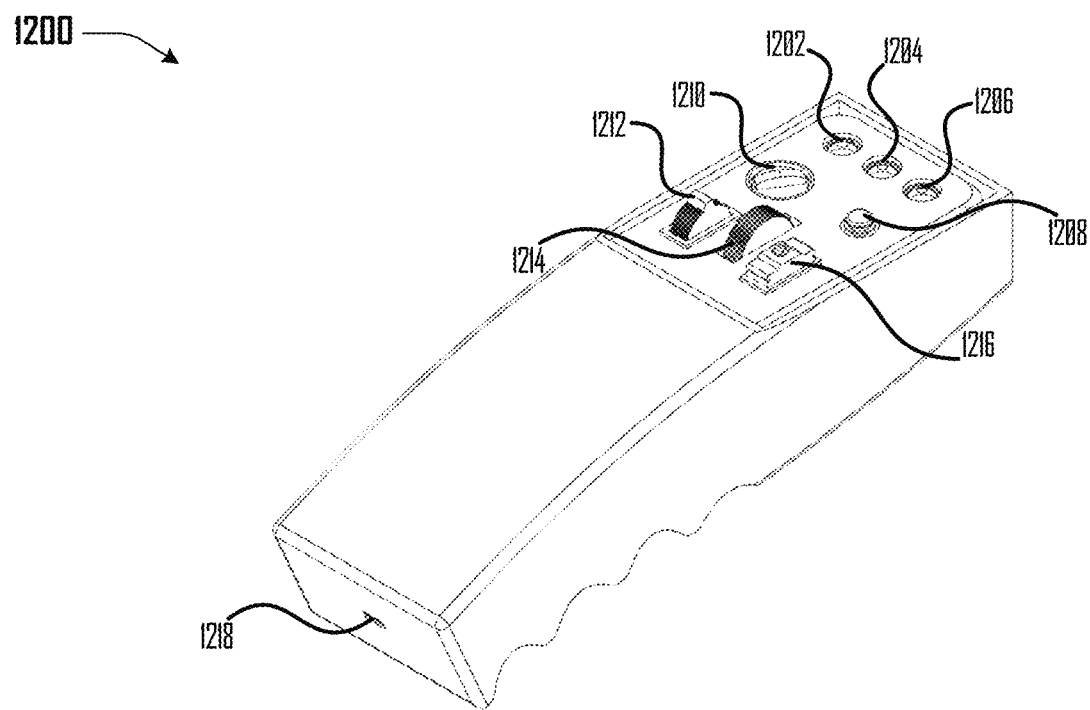
FIG. 12A illustrates a first oblique parallel projection view of a remote interface for long line loiter system, in accordance with an embodiment.
Figure 12B:
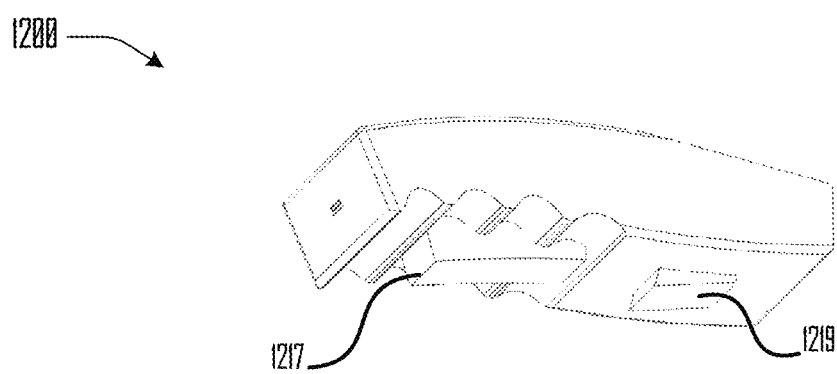
FIG. 12B illustrates a second oblique parallel projection view of the remote interface for long line loiter system, in accordance with an embodiment.

FIG. 12A illustrates a first view of a remote interface 1200 for a hoist and SLCS, in accordance with an embodiment. FIG. 12B illustrates a second view of the remote interface 1200 of FIG. 12A, in accordance with an embodiment. Remote interface 1200 may allow control of or communication with an SLCS and or hoist. Specific types of control means are discussed in the examples below, but the function and/or types of control devices should not be limited thereto. For example, a switch may be interchangeable with a button or a lever. The button may be a mechanically operated button or may be a virtually button. The control devices in the examples below may be interchanged with alternative devices by one of skill the art without undue experimentation or burden. In an embodiment, remote interface 1200 may be a pendant type of hand-operated controller configured to control the operation of an SLCS, hoist, and or carrier.

The types of controls available may be any that are necessary to operate an SLCS, a carrier, and hoist, attached mechanical systems, and/or a payload before or after attachment to the long line and or hoist. In some embodiments, a non-limiting set of controls may comprise caution light 1202, over-temperature warning light 1204, deployment status light 1206, deployment button 1208, boom toggle switch 1210, rotary control switch 1212, hoist vertical control 1214, state selector switch 1216 and data and power port 1218.

As non-limiting examples, caution light 1202 may provide a configurable alert for potentially hazardous conditions. Over-temperature warning light 1204 may provide a configurable alert indicating that a mechanical system is experiencing an over-temperature condition. Deployment status light 1206 may shine green when an SLCS is deployed, may flash green when the SLCS is in position to be stowed, or provide other, similar indications of mechanical system status. Deployment button 1208, when pressed, may begin a deployment process. Deployment button 1208 may stay depressed after being initially pressed to indicate that an SLCS has been deployed. If pressed again, it may return to its undepressed position to indicate that the SLCS has been stowed. If a boom or arm attaches the hoist or hoist housing to the carrier, boom toggle switch 1210 may move the boom from a storage position to an active deployment position. Rotary control switch 1212 may allow direct control of SLCS orientation. This control may be dependent on depression of a controller live trigger. Hoist vertical control 1214 may raise or lower the hoist cable, controlling the up/down motion of the hoist payload.

In an embodiment, state selector switch 1216 may control the state or functional mode of SLCS. For example, the position of the switch may be used to select whether SLCS is in a "stabilize" state, where its fans are used to provide a rotational or lateral impetus to counteract load motion and stabilize the mode. The switch in another position may be used to put the mechanical system in an "idle" state, wherein SLCS is deployed on a long line but does not take any additional action.

In an embodiment, data and power port 1218 may be a USB or equivalent connection port. Connection to this port may provide a path for the controller electronics to interface with any other systems necessary to operate or monitor the hoist integration system and/or attached payloads. As a non-limiting example, the port may receive power and communicate with a remote interface. Remote interface 1200 may have a wired or wireless data connection to hoist logical components and to deployable equipment logical components. The logic for remote interface 1200 may in some embodiments be contained within remote interface 1200, which may still receive power from a proximal power system by means of power port 1218.

As illustrated in FIG. 12B, controls provided on the bottom side of remote interface 1400 may comprise controller live trigger 1217 and a configurable second trigger 1219. Controller live trigger 1217 may be used as a safety mechanism, allowing certain control unit actions only when controller live trigger 1217 is depressed. For example, a rotary control switch may only be operable with it is activated concurrent with pressure on controller live trigger 1217. Configurable second trigger 1219 may be provided to allow additional functionality or safeguards to be implemented for a specific deployable system.

Figures 13A, 13B, 13C:
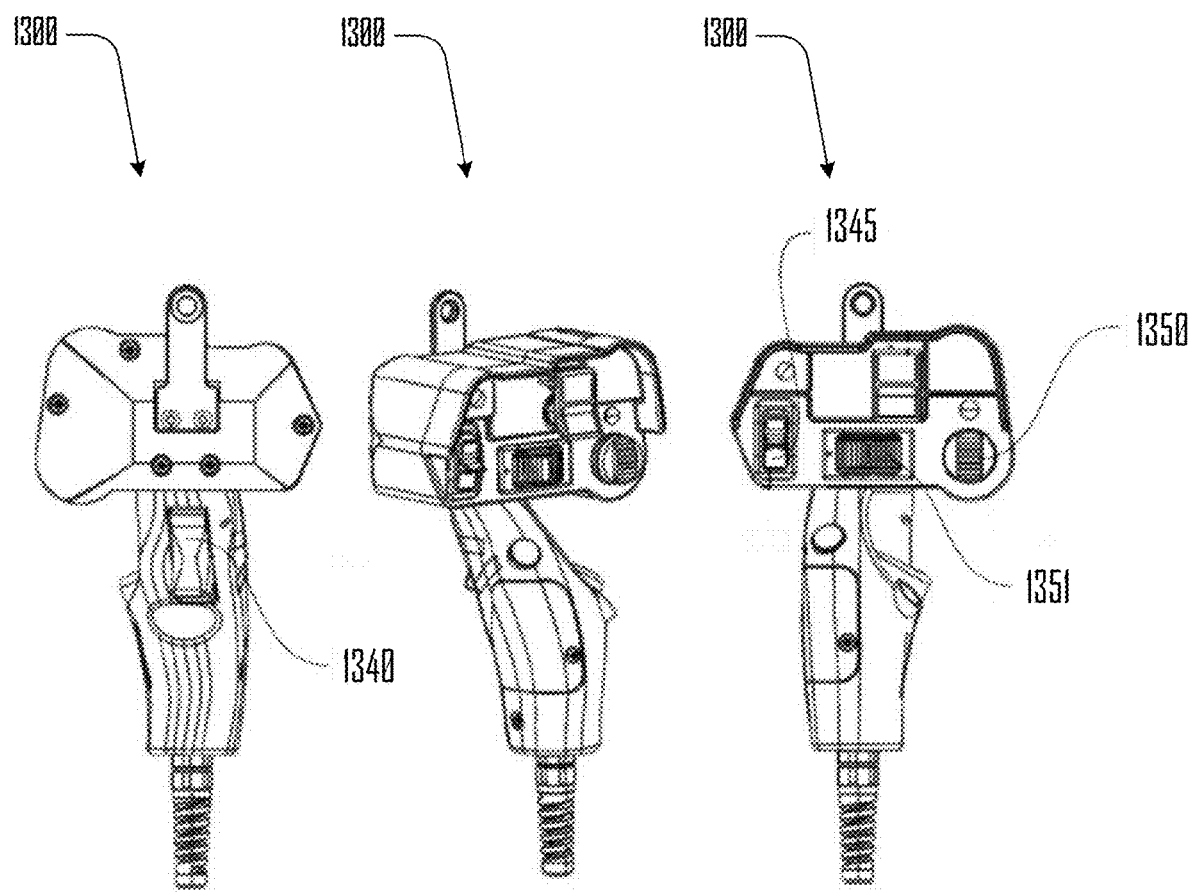
FIG. 13A illustrates back parallel projection view a remote interface of an SLCS, in accordance with an embodiment.
FIG. 13B illustrates an oblique parallel projection view of the remote interface of the SLCS of FIG. 13B, in accordance with an embodiment.
FIG. 13C illustrates a front parallel projection view of the remote interface of an SLCS of FIG. 13B, in accordance with an embodiment.

FIG. 13A illustrates back view of remote pendant or remote interface 1300 of an SLCS, in accordance with an embodiment. FIG. 13B illustrates an oblique view of remote interface 1300 of an SLCS, in accordance with an embodiment. FIG. 13C illustrates a front view of remote interface 1300 of an SLCS, in accordance with an embodiment. These figures illustrate, for example, activation controller 1340, on/off switch 1345, state selector 1350, and manual/rotational control 1351. On/off switch 1345 may be used to turn remote pendant 1300 on or off. State selector 1350 may be used to select a command state of operational module 900, as may be discussed in relation to FIG. 9. Activation controller 1340 may be used to activate or deactivate operational module 1100 in or relative to a command state selected or indicated by state selector 1350. Manual/rotational control 1351 may be used to manually activate fans to rotate or translate a load or to raise or lower a hoist when state selector 1350 has been used to select, for example, direct control mode.

Figure 14:
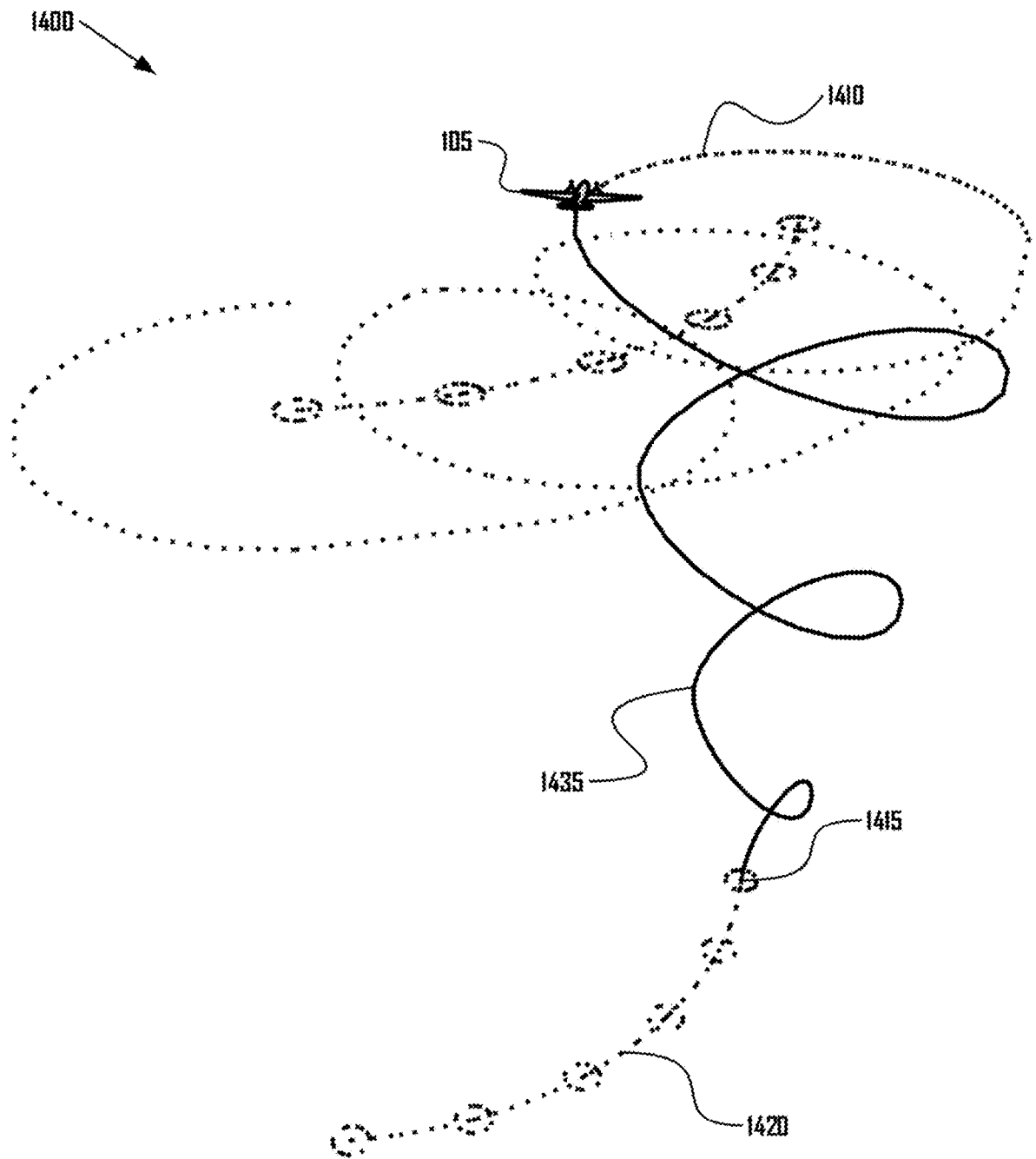
FIG. 14 illustrates a third oblique perspective view of a carrier, a long line, a path of the carrier, and a location of a load and SLCS, in accordance with an embodiment.
Figure 15:
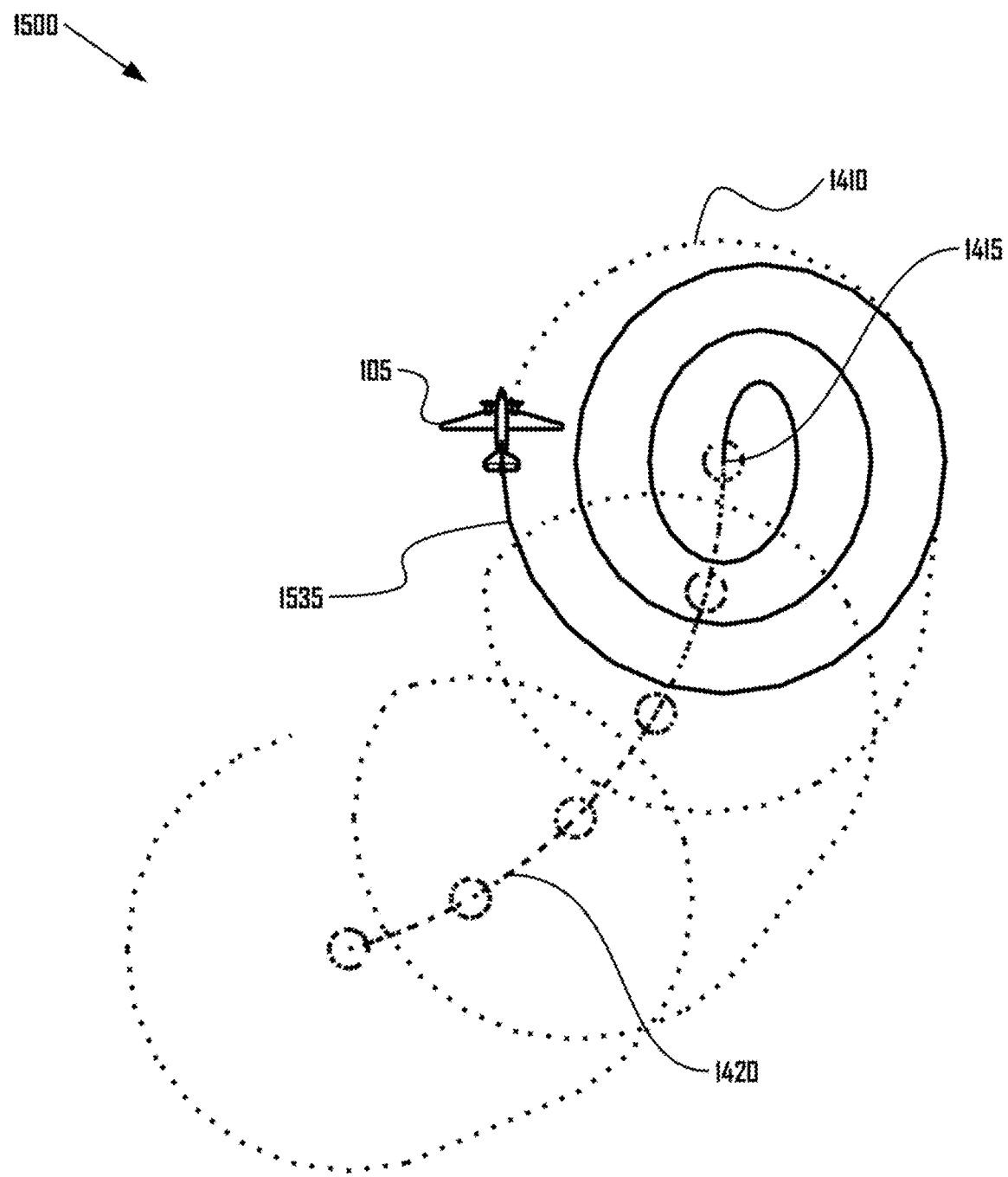
FIG. 15 illustrates a top parallel projection view of the carrier, long line, the path of the carrier, and the location of the load and SLCS of FIG. 14, in accordance with an embodiment.

FIG. 14 illustrates a third oblique perspective view 1400 of carrier 105, long line 1435, path of carrier 1410, and SLCS 1415 (and optionally a load), and moving target location 1420, in accordance with an embodiment. SLCS 1415 may be within a center of orbit (not labeled) of carrier 105. FIG. 15 illustrates a top parallel projection view 1500 of carrier 105, long line 1535, path of the carrier 1410, SLCS 1415, and moving target location 1420, of FIG. 14, in accordance with an embodiment. FIG. 14 and FIG. 15 illustrate that physical and logical components discussed herein may be used to cause SLCS 1415 to follow a moving target location, with periodic or continuous updates to path of carrier 1410 and with SLCS 1415 being directed to output thrust from thrusters to influence a fine location of SLCS 1415 along the moving target location.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a helicopter, crane, or fixed wing carrier, though other carriers may be used. This application is intended to cover any adaptations or variations of the embodiments discussed herein.

Following are non-limiting examples:

Example 1. An apparatus to control a load suspended from a carrier by a long line, comprising: a load control system comprising a fan array and a first sensor suite, wherein the load control system is to be secured to a terminus of the long line and wherein the first sensor suite is to obtain a first state information regarding a first position, motion, and orientation of the load control system; the carrier comprising a hoist and a second sensor suite, wherein the hoist is to control a length of the long line extending from the hoist to the load control system and wherein the second sensor suite is to obtain a second state information regarding a second position, motion, and orientation of the carrier, and wherein the hoist is to obtain a physical information regarding the long line extending from the hoist to the load control system; and a computer processor and a memory; wherein the memory comprises a data fusion module and an operational module; wherein the data fusion module comprises a system model representing the load control system, the carrier, and the long line; and wherein the computer processor is to provide the system model with the first state information, the second state information, and the physical information regarding the long line extending from the hoist to the load control system and wherein the computer processor is to execute the data fusion model to determine: a state of the load control system, the carrier, and the long line, characteristics of the state of the load control system, the carrier, and the long line over time, and a response time among the characteristics of the state of the load control system, the carrier, and the long line over time; and wherein the computer processor is to execute the operational module and, based on the state of the load control system, the carrier, and the long line, the characteristics of the state of the load control system, the carrier, and the long line over time, and the response time among the characteristics of the state of the load control system, the carrier, and the long line over time, is to control the fan array and the hoist, and is to output a navigation instruction to the carrier to influence the position, motion, and orientation of the load control system relative to an objective.

Example 2. The apparatus according to Example 1, wherein the load comprises at least one of the suspended load control system or a load secured to the suspended load control system.

Example 3. The apparatus according to Example 1, wherein the response time exceeds a threshold and wherein, in response thereto, the operational module is to determine the objective to be to minimize perturbation of the state of the load control system, the carrier, the long line, and the characteristics of the state of the load control system, the carrier, and the long line over time.

Example 4. The apparatus according to Example 3, wherein to minimize perturbation of the state of the load control system, the carrier, the long line, and the characteristics of the state of the load control system, the carrier, and the long line over time the operational module is further to output the navigation instruction to the carrier to at least one of direct a loitering path of the carrier, direct a speed of the carrier, or direct a center of orbit of the carrier.

Example 5. The apparatus according to Example 3, wherein the operational module is further to minimize perturbation of the state of the load control system, the carrier, the long line, and the characteristics of the state of the load control system, the carrier, and the long line over time with an instruction to control the hoist to hold static the length of the long line extending from the hoist to the load control system.

Example 6. The apparatus according to Example 1, wherein the data fusion module is further to predict a hazardous state of the load control system and is to determine the objective to be to avoid the hazardous state.

Example 7. The apparatus according to Example 6, wherein the hazardous state of the load control system is at least one of an impact with an object or an excessive acceleration.

Example 8. The apparatus according to Example 7, wherein the hazardous state of the load control system is the impact with an object and wherein the operational module is further to control the fan array to impart a torque or a lateral force on the load control system to avoid the object.

Example 9. The apparatus according to Example 8, wherein operational module is further impart the torque to obtain an orientation and then is to impart the lateral force to move the load control system to avoid the object.

Example 10. The apparatus according to Example 7, wherein the hazardous state of the load control system is the excessive acceleration and wherein the operational module is further to control the hoist to lessen the excessive acceleration.

Example 11. The apparatus according to Example 10, wherein to lessen the excessive acceleration, the operational module is further to control the hoist to let out the long line.

Example 12. The apparatus according to Example 1, wherein the system model comprises at least one of a center or orbit of the carrier, a center or orbit of the suspended load control system, a target location, a mass of the suspended load control system and load, a length of the long line, an inertia of suspended load control system and load, a movement and rotation of the suspended load control system, a height above ground of the suspended load control system, a movement and rotation of the carrier, a height above ground of the carrier, an aerodynamic model of the long line, a gravitational force on the long line, and disturbance estimations of wind force, sea state, and relative motion between the suspended load control system and carrier.

Example 13. The apparatus according to Example 12, wherein the target location moves over time.

Example 14. The apparatus according to Example 12, wherein the center of orbit of the carrier is larger than the target location and wherein the operational module is to control the fan array and the hoist, and is to output a navigation instruction to the carrier to influence the position, motion, and orientation of the load control system relative to the objective within the center of orbit of the carrier.

Example 15. The apparatus according to Example 1, wherein the physical information regarding the long line comprises at least one of a length of the long line extending from the hoist to the load control system, a tension or torque on the hoist from the long line, or a mass on the hoist from the long line.

Example 16. The apparatus according to Example 1, wherein the state of the load control system, the carrier, and the long line comprises a position, orientation, and motion of the carrier and a position, orientation, and motion of the load control system and wherein the operational module is to estimate and predict the state of the load control system, the carrier, and the long line based on the first state information and the second state information, wherein to estimate and predict the state of the load control system, the carrier, and the long line based on the first state information and the second state information, the operational module is to combine the first state information and the second state information from the first sensor suite and the second sensor suite in a non-linear filter according to a system model with feedback from at least one of a functional mode or command state of the operational module, a thrust and orientation mapping, or a carrier, fan array, and hoist mapping.

Example 17. The apparatus according to Example 16, wherein the non-linear filter comprises an unscented Kalman filter.

Example 18. A method to control a load suspended from a carrier by a long line, comprising: with a computer processor and a memory, with a load control system comprising a fan array and a first sensor suite, wherein the load control system is to be secured to a terminus of the long line, with the carrier comprising a hoist and a second sensor suite, wherein the hoist is to control a length of the long line extending from the hoist to the load control system, and with a system model in the memory representing the load control system, the carrier, and the long line, the computer processor obtaining from the first sensor suite a first state information regarding a first position, motion, and orientation of the load control system; the computer processor obtaining from the second sensor suite a second state information regarding a second position, motion, and orientation of the carrier; the computer processor obtaining from the hoist a physical information regarding the long line extending from the hoist to the load control system; and the computer processor providing the system model with the first state information, the second state information, and the physical information regarding the long line extending from the hoist to the load control system; the computer processor determining: a state of the load control system, the carrier, and the long line, characteristics of the state of the load control system, the carrier, and the long line over time, and a response time among the characteristics of the state of the load control system, the carrier, and the long line over time; and, based on the state of the load control system, the carrier, and the long line, the characteristics of the state of the load control system, the carrier, and the long line over time, and the response time among the characteristics of the state of the load control system, the carrier, and the long line over time, the computer processor controlling the fan array and the hoist, and outputting a navigation instruction to the carrier to influence the position, motion, and orientation of the load control system relative to an objective.

Example 19. The method according to Example 18, wherein the load comprises at least one of the suspended load control system or a load secured to the suspended load control system.

Example 20. The method according to Example 18, the computer processor further determining that the response time exceeds a threshold and, in response thereto, determining the objective to be to minimize perturbation of the state of the load control system, the carrier, the long line, and the characteristics of the state of the load control system, the carrier, and the long line over time.

Example 21. The method according to Example 20, wherein to minimize perturbation of the state of the load control system, the carrier, the long line, and the characteristics of the state of the load control system, the carrier, and the long line over time the computer processor further outputting the navigation instruction to the carrier to at least one of direct a loitering path of the carrier, direct a speed of the carrier, or direct a center of orbit of the carrier.

Example 22. The method according to Example 20, wherein the computer processor is further to minimize perturbation of the state of the load control system, the carrier, the long line, and the characteristics of the state of the load control system, the carrier, and the long line over time by controlling the hoist to hold static the length of the long line extending from the hoist to the load control system.

Example 23. The method according to Example 18, the computer processor further predicting a hazardous state of the load control system and determining the objective to be to avoid the hazardous state.

Example 24. The method according to Example 23, wherein the hazardous state of the load control system is at least one of an impact with an object or an excessive acceleration.

Example 25. The method according to Example 24, wherein the hazardous state of the load control system is the impact with an object and the computer processor further controlling the fan array to impart a torque or a lateral force on the load control system to avoid the object.

Example 26. The method according to Example 25, the computer processor further imparting the torque to obtain an orientation and then imparting the lateral force to move the load control system to avoid the object.

Example 27. The method according to Example 24, wherein the hazardous state of the load control system is the excessive acceleration and the computer processor controlling the hoist to lessen the excessive acceleration.

Example 28. The method according to Example 27, wherein to lessen the excessive acceleration, the computer process further controlling the hoist to let out the long line.

Example 29. The method according to Example 18, wherein the system model comprises at least one of a center or orbit of the carrier, a center or orbit of the suspended load control system, a target location, a mass of the suspended load control system and load, a length of the long line, an inertia of suspended load control system and load, a movement and rotation of the suspended load control system, a height above ground of the suspended load control system, a movement and rotation of the carrier, a height above ground of the carrier, an aerodynamic model of the long line, a gravitational force on the long line, and disturbance estimations of wind force, sea state, and relative motion between the suspended load control system and carrier.

Example 30. The method according to Example 29, wherein the target location moves over time.

Example 31. The method according to Example 29, wherein the center of orbit of the carrier is larger than the target location and the computer processor further controlling the fan array and the hoist, and outputting a navigation instruction to the carrier to influence the position, motion, and orientation of the load control system relative to the objective within the center of orbit of the carrier.

Example 32. The method according to Example 18, wherein the physical information regarding the long line comprises at least one of a length of the long line extending from the hoist to the load control system, a tension or torque on the hoist from the long line, or a mass on the hoist from the long line.

Example 33. The method according to Example 18, wherein the state of the load control system, the carrier, and the long line comprises a position, orientation, and motion of the carrier and a position, orientation, and motion of the load control system and the computer processor further estimating and predicting the state of the load control system, the carrier, and the long line based on the first state information and the second state information, wherein estimating and predicting the state of the load control system, the carrier, and the long line based on the first state information and the second state information comprises combining the first state information and the second state information from the first sensor suite and the second sensor suite in a non-linear filter according to the system model with feedback from at least one of a functional mode or command state, a thrust and orientation mapping, or a carrier, fan array, and hoist mapping.

Example 34. The method according to Example 33, wherein the non-linear filter comprises an unscented Kalman filter.

Example 35. A computer apparatus to control a load suspended from a carrier by a long line, comprising: a load control system, a carrier, a computer processor and memory; wherein the load control system comprises a fan array, a first sensor suite, and means to secure the load control system to a terminus of the long line; wherein the carrier comprises a hoist and a second sensor suite, wherein the hoist comprises means to control a length of the long line extending from the hoist to the load control system; wherein the memory comprises a system model, wherein the system model represents the load control system, the carrier, and the long line; the computer processor comprising means to obtain from the first sensor suite a first state information regarding a first position, motion, and orientation of the load control system; the computer processor further comprising means to obtain from the second sensor suite a second state information regarding a second position, motion, and orientation of the carrier; the computer processor further comprising means to obtain from the hoist a physical information regarding the long line extending from the hoist to the load control system; and the computer processor further comprising means to provide the system model with the first state information, the second state information, and the physical information regarding the long line extending from the hoist to the load control system; the computer processor further comprising means to determine: a state of the load control system, the carrier, and the long line, characteristics of the state of the load control system, the carrier, and the long line over time, and a response time among the characteristics of the state of the load control system, the carrier, and the long line over time; and, based on the state of the load control system, the carrier, and the long line, the characteristics of the state of the load control system, the carrier, and the long line over time, and the response time among the characteristics of the state of the load control system, the carrier, and the long line over time, the computer processor further comprising means to control the fan array and the hoist, and output a navigation instruction to the carrier to influence the position, motion, and orientation of the load control system relative to an objective.

Example 36. The apparatus according to Example 35, wherein the load comprises at least one of the suspended load control system or a load secured to the suspended load control system.

Example 37. The apparatus according to Example 35, the computer processor further comprising means to determine that the response time exceeds a threshold and, in response thereto, means to determine the objective to be to minimize perturbation of the state of the load control system, the carrier, the long line, and the characteristics of the state of the load control system, the carrier, and the long line over time.

Example 38. The apparatus according to Example 37, wherein to minimize perturbation of the state of the load control system, the carrier, the long line, and the characteristics of the state of the load control system, the carrier, and the long line over time the computer processor further comprising means to output the navigation instruction to the carrier to at least one of direct a loitering path of the carrier, direct a speed of the carrier, or direct a center of orbit of the carrier.

Example 39. The apparatus according to Example 37, wherein the computer processor further comprising means to minimize perturbation of the state of the load control system, the carrier, the long line, and the characteristics of the state of the load control system, the carrier, and the long line over time by controlling the hoist to hold static the length of the long line extending from the hoist to the load control system.

Example 40. The apparatus according to Example 35, the computer processor further comprising means to predict a hazardous state of the load control system and means to determine the objective to be to avoid the hazardous state.

Example 41. The apparatus according to Example 40, wherein the hazardous state of the load control system is at least one of an impact with an object or an excessive acceleration.

Example 42. The apparatus according to Example 41, wherein the hazardous state of the load control system is the impact with an object and the computer processor further comprising means to control the fan array to impart a torque or a lateral force on the load control system to avoid the object.

Example 43. The apparatus according to Example 42, the computer processor further comprising means to impart the torque to obtain an orientation and then impart the lateral force to move the load control system to avoid the object.

Example 44. The apparatus according to Example 41, wherein the hazardous state of the load control system is the excessive acceleration and the computer processor further comprising means to control the hoist to lessen the excessive acceleration.

Example 45. The apparatus according to Example 44, wherein to lessen the excessive acceleration, the computer processor further comprises means to control the hoist to let out the long line.

Example 46. The apparatus according to Example 35, wherein the system model comprises at least one of a center or orbit of the carrier, a center or orbit of the suspended load control system, a target location, a mass of the suspended load control system and load, a length of the long line, an inertia of suspended load control system and load, a movement and rotation of the suspended load control system, a height above ground of the suspended load control system, a movement and rotation of the carrier, a height above ground of the carrier, an aerodynamic model of the long line, a gravitational force on the long line, and disturbance estimations of wind force, sea state, and relative motion between the suspended load control system and carrier.

Example 47. The apparatus according to Example 46, wherein the target location moves over time.

Example 48. The apparatus according to Example 46, wherein the center of orbit of the carrier is larger than the target location and the computer processor further comprising means to control the fan array and the hoist, and means to output a navigation instruction to the carrier to influence the position, motion, and orientation of the load control system relative to the objective within the center of orbit of the carrier.

Example 49. The apparatus according to Example 35, wherein the physical information regarding the long line comprises at least one of a length of the long line extending from the hoist to the load control system, a tension or torque on the hoist from the long line, or a mass on the hoist from the long line.

Example 50. The apparatus according to Example 35, wherein the state of the load control system, the carrier, and the long line comprises a position, orientation, and motion of the carrier and a position, orientation, and motion of the load control system and the computer processor further comprising means to estimate and predict the state of the load control system, the carrier, and the long line based on the first state information and the second state information, wherein the means to estimate and predict the state of the load control system, the carrier, and the long line based on the first state information and the second state information comprises means to combine the first state information and the second state information from the first sensor suite and the second sensor suite in a non-linear filter according to the system model with feedback from at least one of a functional mode or command state, a thrust and orientation mapping, or a carrier, fan array, and hoist mapping.

Example 51. The apparatus according to Example 50, wherein the non-linear filter comprises an unscented Kalman filter.

Example 52. One or more computer-readable media comprising instructions that cause a computer device, in response to execution of the instructions by a computer processor of the computer device, to control a load suspended from a carrier by a long line, comprising: with a load control system, wherein the load control system comprises a fan array and a first sensor suite, and wherein the load control system is secured to a terminus of the long line; with the carrier comprising a hoist and a second sensor suite, wherein the hoist is to control a length of the long line extending from the hoist to the load control system; and wherein the instructions comprises a system model, wherein the system model represents the load control system, the carrier, and the long line; the instructions to cause the computer device to: obtain from the first sensor suite a first state information regarding a first position, motion, and orientation of the load control system; obtain from the second sensor suite a second state information regarding a second position, motion, and orientation of the carrier; obtain from the hoist a physical information regarding the long line extending from the hoist to the load control system; provide the system model with the first state information, the second state information, and the physical information regarding the long line extending from the hoist to the load control system; determine based thereon: a state of the load control system, the carrier, and the long line, characteristics of the state of the load control system, the carrier, and the long line over time, and a response time among the characteristics of the state of the load control system, the carrier, and the long line over time; and, based on the state of the load control system, the carrier, and the long line, the characteristics of the state of the load control system, the carrier, and the long line over time, and the response time among the characteristics of the state of the load control system, the carrier, and the long line over time, control the fan array and the hoist, and output a navigation instruction to the carrier to influence the position, motion, and orientation of the load control system relative to an objective.

Example 53. The computer-readable media according to Example 52, wherein the load comprises at least one of the suspended load control system or a load secured to the suspended load control system.

Example 54. The computer-readable media according to Example 52, the instructions further to cause the computer device to determine that the response time exceeds a threshold and, in response thereto, to determine the objective to be to minimize perturbation of the state of the load control system, the carrier, the long line, and the characteristics of the state of the load control system, the carrier, and the long line over time.

Example 55. The computer-readable media according to Example 54, wherein to minimize perturbation of the state of the load control system, the carrier, the long line, and the characteristics of the state of the load control system, the carrier, and the long line over time the instructions further to cause the computer device to output the navigation instruction to the carrier to at least one of direct a loitering path of the carrier, direct a speed of the carrier, or direct a center of orbit of the carrier.

Example 56. The computer-readable media according to Example 54, the instructions further to cause the computer device to minimize perturbation of the state of the load control system, the carrier, the long line, and the characteristics of the state of the load control system, the carrier, and the long line over time by controlling the hoist to hold static the length of the long line extending from the hoist to the load control system.

Example 57. The computer-readable media according to Example 52, the instructions further to cause the computer device to predict a hazardous state of the load control system and to determine the objective to be to avoid the hazardous state.

Example 58. The computer-readable media according to Example 57, wherein the hazardous state of the load control system is at least one of an impact with an object or an excessive acceleration.

Example 59. The computer-readable media according to Example 58, wherein the hazardous state of the load control system is the impact with an object and the instructions are further to cause the computer device to control the fan array to impart a torque or a lateral force on the load control system to avoid the object.

Example 60. The computer-readable media according to Example 59, the instructions further to cause the computer device to impart the torque to obtain an orientation and then impart the lateral force to move the load control system to avoid the object.

Example 61. The computer-readable media according to Example 58, wherein the hazardous state of the load control system is the excessive acceleration and the instructions further to control the hoist to lessen the excessive acceleration.

Example 62. The computer-readable media according to Example 61, wherein to lessen the excessive acceleration, the instructions are further to control the hoist to let out the long line.

Example 63. The computer-readable media according to Example 52, wherein the system model comprises at least one of a center or orbit of the carrier, a center or orbit of the suspended load control system, a target location, a mass of the suspended load control system and load, a length of the long line, an inertia of suspended load control system and load, a movement and rotation of the suspended load control system, a height above ground of the suspended load control system, a movement and rotation of the carrier, a height above ground of the carrier, an aerodynamic model of the long line, a gravitational force on the long line, and disturbance estimations of wind force, sea state, and relative motion between the suspended load control system and carrier.

Example 64. The computer-readable media according to Example 63, wherein the target location moves over time.

Example 65. The computer-readable media according to Example 63, wherein the center of orbit of the carrier is larger than the target location and the instructions are further to cause the computer device to control the fan array and the hoist, and output a navigation instruction to the carrier to influence the position, motion, and orientation of the load control system relative to the objective within the center of orbit of the carrier.

Example 66. The computer-readable media according to Example 52, wherein the physical information regarding the long line comprises at least one of a length of the long line extending from the hoist to the load control system, a tension or torque on the hoist from the long line, or a mass on the hoist from the long line.

Example 67. The computer-readable media according to Example 52, wherein the state of the load control system, the carrier, and the long line comprises a position, orientation, and motion of the carrier and a position, orientation, and motion of the load control system and the instructions are further to cause the computer device to estimate and predict the state of the load control system, the carrier, and the long line based on the first state information and the second state information, wherein to estimate and predict the state of the load control system, the carrier, and the long line based on the first state information and the second state information comprises to combine the first state information and the second state information from the first sensor suite and the second sensor suite in a non-linear filter according to the system model with feedback from at least one of a functional mode or command state, a thrust and orientation mapping, or a carrier, fan array, and hoist mapping.

Example 68. The computer-readable media according to Example 67, wherein the non-linear filter comprises an unscented Kalman filter.

The invention claimed is:

1. An apparatus to control a load suspended from a carrier by a long line, comprising:
   a load control system comprising a fan array and a first sensor suite, wherein the load control system is to be secured to a terminus of the long line and wherein the first sensor suite is to obtain a first state information regarding a first position, motion, and orientation of the load control system;
   the carrier comprising a hoist and a second sensor suite, wherein the hoist is to control a length of the long line extending from the hoist to the load control system and wherein the second sensor suite is to obtain a second state information regarding a second position, motion, and orientation of the carrier, and wherein the hoist is to obtain a physical information regarding the long line extending from the hoist to the load control system;
   a computer processor and a memory;
   wherein the memory comprises a data fusion module and an operational module;
   wherein the data fusion module comprises a system model representing the load control system, the carrier, and the long line; and
   wherein the computer processor is to provide the system model with the first state information, the second state information, and the physical information regarding the long line extending from the hoist to the load control system and wherein the computer processor is to execute the data fusion model to determine: a state of the load control system, the carrier, and the long line, characteristics of the state of the load control system, the carrier, and the long line over time, and a response time among the characteristics of the state of the load control system, the carrier, and the long line over time; and wherein the computer processor is to execute the operational module and, based on the state of the load control system, the carrier, and the long line, the characteristics of the state of the load control system, the carrier, and the long line over time, and the response time among the characteristics of the state of the load control system, the carrier, and the long line over time, is to control the fan array and the hoist, and is to output a navigation instruction to the carrier to influence the position, motion, and orientation of the load control system relative to an objective.

2. The apparatus according to claim 1, wherein the response time exceeds a threshold and wherein, in response thereto, the operational module is to determine the objective to be to minimize perturbation of the state of the load control system, the carrier, the long line, and the characteristics of the state of the load control system, the carrier, and the long line over time.

3. The apparatus according to claim 2, wherein the operational module is further to minimize perturbation of the state of the load control system, the carrier, the long line, and the characteristics of the state of the load control system, the carrier, and the long line over time with an instruction to control the hoist to hold static the length of the long line extending from the hoist to the load control system.

4. The apparatus according to claim 1, wherein the data fusion module is further to predict a hazardous state of the load control system and is to determine the objective to be to avoid the hazardous state.

5. The apparatus according to claim 4, wherein the hazardous state of the load control system is at least one of an impact with an object or an excessive acceleration.

6. The apparatus according to claim 5, wherein the hazardous state of the load control system is the impact with an object and wherein the operational module is further to control the fan array to impart a torque or a lateral force on the load control system to avoid the object.

7. The apparatus according to claim 5, wherein the hazardous state of the load control system is the excessive acceleration and wherein the operational module is further to control the hoist to lessen the excessive acceleration.

8. A method to control a load suspended from a carrier by a long line, comprising: with a computer processor and a memory, with a load control system comprising a fan array and a first sensor suite, wherein the load control system is to be secured to a terminus of the long line, with the carrier comprising a hoist and a second sensor suite, wherein the hoist is to control a length of the long line extending from the hoist to the load control system, and with a system model in the memory representing the load control system, the carrier, and the long line, the computer processor obtaining from the first sensor suite a first state information regarding a first position, motion, and orientation of the load control system; the computer processor obtaining from the second sensor suite a second state information regarding a second position, motion, and orientation of the carrier; the computer processor obtaining from the hoist a physical information regarding the long line extending from the hoist to the load control system; and the computer processor providing the system model with the first state information, the second state information, and the physical information regarding the long line extending from the hoist to the load control system; the computer processor determining: a state of the load control system, the carrier, and the long line, characteristics of the state of the load control system, the carrier, and the long line over time, and a response time among the characteristics of the state of the load control system, the carrier, and the long line over time; and, based on the state of the load control system, the carrier, and the long line, the characteristics of the state of the load control system, the carrier, and the long line over time, and the response time among the characteristics of the state of the load control system, the carrier, and the long line over time, the computer processor controlling the fan array and the hoist, and outputting a navigation instruction to the carrier to influence the position, motion, and orientation of the load control system relative to an objective.

9. The method according to claim 8, the computer processor further determining that the response time exceeds a threshold and, in response thereto, determining the objective to be to minimize perturbation of the state of the load control system, the carrier, the long line, and the characteristics of the state of the load control system, the carrier, and the long line over time.

10. The method according to claim 9, the computer processor further minimizing perturbation of the state of the load control system, the carrier, the long line, and the characteristics of the state of the load control system, the carrier, and the long line over time by controlling the hoist to hold static the length of the long line extending from the hoist to the load control system.

11. The method according to claim 8, the computer processor further predicting a hazardous state of the load control system and determining the objective to be to avoid the hazardous state.

12. The method according to claim 11, wherein the hazardous state of the load control system is at least one of an impact with an object or an excessive acceleration.

13. The method according to claim 12, wherein the hazardous state of the load control system is the impact with an object and the computer processor further controlling the fan array to impart a torque or a lateral force on the load control system to avoid the object.

14. The method according to claim 12, wherein the hazardous state of the load control system is the excessive acceleration and the computer processor controlling the hoist to lessen the excessive acceleration.

15. The method according to claim 14, wherein to lessen the excessive acceleration, the computer process further controlling the hoist to let out the long line.

16. One or more computer-readable media comprising instructions that cause a computer device, in response to execution of the instructions by a computer processor of the computer device, to control a load suspended from a carrier by a long line, comprising:
with a load control system, wherein the load control system comprises a fan array and a first sensor suite, and wherein the load control system is secured to a terminus of the long line;
with the carrier comprising a hoist and a second sensor suite, wherein the hoist is to control a length of the long line extending from the hoist to the load control system; and
wherein the instructions comprise a system model, wherein the system model represents the load control system, the carrier, and the long line;
the instructions to cause the computer device to:
obtain from the first sensor suite a first state information regarding a first position, motion, and orientation of the load control system; obtain from the second sensor suite a second state information regarding a second position, motion, and orientation of the carrier;
obtain from the hoist a physical information regarding the long line extending from the hoist to the load control system; provide the system model with the first state information, the second state information, and the physical information regarding the long line extending from the hoist to the load control system;
determine based thereon: a state of the load control system, the carrier, and the long line, characteristics of the state of the load control system, the carrier, and the long line over time, and a response time among the characteristics of the state of the load control system, the carrier, and the long line over time; and, based on the state of the load control system, the carrier, and the long line, the characteristics of the state of the load control system, the carrier, and the long line over time, and the response time among the characteristics of the state of the load control system, the carrier, and the long line over time,
control the fan array and the hoist, and output a navigation instruction to the carrier to influence the position, motion, and orientation of the load control system relative to an objective.

17. The computer-readable media according to claim 16, the instructions further to cause the computer device to determine that the response time exceeds a threshold and, in response thereto, to determine the objective to be to minimize perturbation of the state of the load control system, the carrier, the long line, and the characteristics of the state of the load control system, the carrier, and the long line over time.

18. The computer-readable media according to claim 17, the instructions further to cause the computer device to minimize perturbation of the state of the load control system, the carrier, the long line, and the characteristics of the state of the load control system, the carrier, and the long line over time by controlling the hoist to hold static the length of the long line extending from the hoist to the load control system.

19. The computer-readable media according to claim 16, the instructions further to cause the computer device to predict a hazardous state of the load control system and to determine the objective to be to avoid the hazardous state.

20. The computer-readable media according to claim 19, wherein the hazardous state of the load control system is at least one of an impact with an object or an excessive acceleration.

* * * * *